(12) United States Patent
King et al.

(10) Patent No.: US 8,600,196 B2
(45) Date of Patent: Dec. 3, 2013

(54) OPTICAL SCANNERS, SUCH AS HAND-HELD OPTICAL SCANNERS

(75) Inventors: Martin T. King, Vashon Island, WA (US); Cheryl Grunbock, legal representative, Vashon Island, WA (US); Claes-Fredrik Mannby, Issaquah, WA (US); Thomas C. Arends, Bellevue, WA (US); David P. Bajorins, Bothell, WA (US); Daniel C. Fox, Duvall, WA (US)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 12/831,213

(22) Filed: Jul. 6, 2010

(65) Prior Publication Data

US 2011/0142371 A1 Jun. 16, 2011

Related U.S. Application Data

(63) Continuation of application No. 12/517,352, filed as application No. PCT/EP2007/007824 on Sep. 7, 2007, now abandoned.

(60) Provisional application No. 60/843,362, filed on Sep. 8, 2006, provisional application No. 60/844,894, filed on Sep. 15, 2006, provisional application No. 60/845,604, filed on Sep. 18, 2006.

(51) Int. Cl.
*G06K 9/22* (2006.01)
*H04N 1/04* (2006.01)
*H04N 1/024* (2006.01)

(52) U.S. Cl.
USPC ............................ 382/313; 382/321; 358/474

(58) Field of Classification Search
USPC .................... 382/313, 321, 322; 358/473, 474
See application file for complete search history.

(56) References Cited

U.S. PATENT DOCUMENTS

| | | | |
|---|---|---|---|
| 3,899,687 A | 8/1975 | Jones | |
| 3,917,317 A | 11/1975 | Ryan | |
| 4,052,058 A | 10/1977 | Hintz | |
| 4,065,778 A | 12/1977 | Harvey | |
| 4,135,791 A * | 1/1979 | Govignon | 351/206 |
| 4,358,824 A | 11/1982 | Glickman et al. | |
| 4,526,078 A | 7/1985 | Chadabe | |
| 4,538,072 A | 8/1985 | Immler et al. | |
| 4,553,261 A | 11/1985 | Froessl | |
| 4,610,025 A | 9/1986 | Blum et al. | |
| 4,633,507 A | 12/1986 | Cannistra et al. | |

(Continued)

FOREIGN PATENT DOCUMENTS

| | | |
|---|---|---|
| EP | 0424803 | 5/1991 |
| EP | 0544434 | 6/1993 |

(Continued)

OTHER PUBLICATIONS

Liddy, Elizabeth, "How a Search Engine Works," InfoToday.com, vol. 9, No. 5, May 2001, pp. 1-7.

(Continued)

*Primary Examiner* — Jon Chang
(74) *Attorney, Agent, or Firm* — Fish & Richardson P.C.

(57) ABSTRACT

A hand-held optical scanner is described. The hand-held optical scanner has an image sensor, as well as a scan window through which image light is directed toward the image sensor.

18 Claims, 11 Drawing Sheets

(56) References Cited

U.S. PATENT DOCUMENTS

| | | | |
|---|---|---|---|
| 4,636,848 A | 1/1987 | Yamamoto | |
| 4,713,008 A | 12/1987 | Stocker et al. | |
| 4,716,804 A | 1/1988 | Chadabe | |
| 4,748,678 A | 5/1988 | Takeda et al. | |
| 4,776,464 A | 10/1988 | Miller et al. | |
| 4,804,949 A | 2/1989 | Faulkerson | |
| 4,805,099 A | 2/1989 | Huber | |
| 4,829,453 A | 5/1989 | Katsuta et al. | |
| 4,829,872 A | 5/1989 | Topic et al. | |
| 4,890,230 A | 12/1989 | Tanoshima et al. | |
| D306,162 S | 2/1990 | Faulkerson et al. | |
| 4,901,364 A | 2/1990 | Faulkerson et al. | |
| 4,903,229 A | 2/1990 | Schmidt et al. | |
| 4,914,709 A | 4/1990 | Rudak | |
| 4,941,125 A | 7/1990 | Boyne | |
| 4,947,261 A | 8/1990 | Ishikawa et al. | |
| 4,949,391 A | 8/1990 | Faulkerson et al. | |
| 4,955,693 A * | 9/1990 | Bobba | 359/894 |
| 4,958,379 A | 9/1990 | Yamaguchi et al. | |
| 4,968,877 A | 11/1990 | McAvinney et al. | |
| 4,985,863 A | 1/1991 | Fujisawa et al. | |
| 4,988,981 A | 1/1991 | Zimmerman et al. | |
| 5,010,500 A | 4/1991 | Makkuni et al. | |
| 5,012,349 A | 4/1991 | de Fay et al. | |
| 5,062,143 A | 10/1991 | Schmitt | |
| 5,083,218 A | 1/1992 | Takasu et al. | |
| 5,093,873 A | 3/1992 | Takahashi | |
| 5,107,256 A | 4/1992 | Ueno et al. | |
| 5,109,439 A | 4/1992 | Froessl | |
| 5,119,081 A | 6/1992 | Ikehira | |
| 5,133,024 A | 7/1992 | Froessl et al. | |
| 5,133,052 A | 7/1992 | Bier et al. | |
| 5,136,687 A | 8/1992 | Edelman et al. | |
| 5,142,161 A | 8/1992 | Brackmann | |
| 5,146,404 A | 9/1992 | Calloway et al. | |
| 5,146,552 A | 9/1992 | Cassorla et al. | |
| 5,157,384 A | 10/1992 | Greanias et al. | |
| 5,159,668 A | 10/1992 | Kaasila | |
| 5,168,147 A | 12/1992 | Bloomberg | |
| 5,168,565 A | 12/1992 | Morita | |
| 5,179,652 A | 1/1993 | Rozmanith et al. | |
| 5,185,857 A | 2/1993 | Rozmanith et al. | |
| 5,201,010 A | 4/1993 | Deaton et al. | |
| 5,202,985 A | 4/1993 | Goyal | |
| 5,203,704 A | 4/1993 | McCloud | |
| 5,212,739 A | 5/1993 | Johnson | |
| 5,229,590 A | 7/1993 | Harden et al. | |
| 5,231,698 A | 7/1993 | Forcier | |
| 5,243,149 A | 9/1993 | Comerford et al. | |
| 5,247,285 A | 9/1993 | Yokota et al. | |
| 5,251,106 A | 10/1993 | Hui | |
| 5,251,316 A | 10/1993 | Anick et al. | |
| 5,252,951 A | 10/1993 | Tannenbaum et al. | |
| RE34,476 E | 12/1993 | Norwood | |
| 5,272,324 A | 12/1993 | Blevins | |
| 5,288,938 A | 2/1994 | Wheaton | |
| 5,301,243 A | 4/1994 | Olschafskie et al. | |
| 5,347,295 A | 9/1994 | Agulnick et al. | |
| 5,347,306 A | 9/1994 | Nitta | |
| 5,347,477 A | 9/1994 | Lee | |
| 5,355,146 A | 10/1994 | Chiu et al. | |
| 5,360,971 A | 11/1994 | Kaufman et al. | |
| 5,367,453 A | 11/1994 | Capps et al. | |
| 5,371,348 A | 12/1994 | Kumar et al. | |
| 5,377,706 A | 1/1995 | Huang | |
| 5,398,310 A | 3/1995 | Tchao et al. | |
| 5,404,442 A | 4/1995 | Foster et al. | |
| 5,404,458 A | 4/1995 | Zetts | |
| 5,418,684 A | 5/1995 | Koenck et al. | |
| 5,418,717 A | 5/1995 | Su et al. | |
| 5,418,951 A | 5/1995 | Damashek | |
| 5,423,554 A | 6/1995 | Davis | |
| 5,430,558 A | 7/1995 | Sohaei et al. | |
| 5,438,630 A | 8/1995 | Chen et al. | |
| 5,444,779 A | 8/1995 | Daniele | |
| 5,452,442 A | 9/1995 | Kephart | |
| 5,454,043 A | 9/1995 | Freeman | |
| 5,462,473 A | 10/1995 | Sheller | |
| 5,465,325 A | 11/1995 | Capps et al. | |
| 5,465,353 A | 11/1995 | Hull et al. | |
| 5,467,425 A | 11/1995 | Lau et al. | |
| 5,481,278 A | 1/1996 | Shigematsu et al. | |
| 5,485,565 A | 1/1996 | Saund et al. | |
| 5,488,196 A | 1/1996 | Zimmerman et al. | |
| 5,499,108 A | 3/1996 | Cotte et al. | |
| 5,500,920 A | 3/1996 | Kupiec | |
| 5,500,937 A | 3/1996 | Thompson-Rohrlich | |
| 5,502,803 A | 3/1996 | Yoshida et al. | |
| 5,512,707 A | 4/1996 | Ohshima | |
| 5,517,331 A | 5/1996 | Murai et al. | |
| 5,517,578 A | 5/1996 | Altman et al. | |
| 5,522,798 A | 6/1996 | Johnson et al. | |
| 5,532,469 A | 7/1996 | Shepard et al. | |
| 5,533,141 A | 7/1996 | Futatsugi et al. | |
| 5,539,427 A | 7/1996 | Bricklin et al. | |
| 5,541,419 A | 7/1996 | Arackellian | |
| 5,543,591 A | 8/1996 | Gillespie et al. | |
| 5,550,930 A | 8/1996 | Berman et al. | |
| 5,555,363 A | 9/1996 | Tou et al. | |
| 5,563,996 A | 10/1996 | Tchao | |
| 5,568,452 A | 10/1996 | Kronenberg | |
| 5,570,113 A | 10/1996 | Zetts | |
| 5,574,804 A | 11/1996 | Olschafskie et al. | |
| 5,581,276 A | 12/1996 | Cipolla et al. | |
| 5,581,670 A | 12/1996 | Bier et al. | |
| 5,581,681 A | 12/1996 | Tchao et al. | |
| 5,583,542 A | 12/1996 | Capps et al. | |
| 5,583,543 A | 12/1996 | Takahashi et al. | |
| 5,583,980 A | 12/1996 | Anderson | |
| 5,590,219 A | 12/1996 | Gourdol | |
| 5,590,256 A | 12/1996 | Tchao et al. | |
| 5,592,566 A | 1/1997 | Pagallo et al. | |
| 5,594,469 A | 1/1997 | Freeman et al. | |
| 5,594,640 A | 1/1997 | Capps et al. | |
| 5,594,810 A | 1/1997 | Gourdol | |
| 5,595,445 A | 1/1997 | Bobry | |
| 5,596,697 A | 1/1997 | Foster et al. | |
| 5,600,765 A | 2/1997 | Ando et al. | |
| 5,602,376 A * | 2/1997 | Coleman et al. | 235/462.44 |
| 5,602,570 A | 2/1997 | Capps et al. | |
| 5,608,778 A | 3/1997 | Partridge, III | |
| 5,612,719 A | 3/1997 | Beernink et al. | |
| 5,624,265 A | 4/1997 | Redford et al. | |
| 5,625,711 A | 4/1997 | Nicholson et al. | |
| 5,625,833 A | 4/1997 | Levine et al. | |
| 5,627,960 A | 5/1997 | Clifford et al. | |
| 5,638,092 A | 6/1997 | Eng et al. | |
| 5,649,060 A | 7/1997 | Ellozy et al. | |
| 5,652,849 A | 7/1997 | Conway et al. | |
| 5,656,804 A | 8/1997 | Barkan et al. | |
| 5,659,638 A | 8/1997 | Bengtson | |
| 5,663,514 A | 9/1997 | Usa | |
| 5,663,808 A | 9/1997 | Park | |
| 5,668,573 A | 9/1997 | Favot et al. | |
| 5,677,710 A | 10/1997 | Thompson-Rohrlich | |
| 5,680,607 A | 10/1997 | Brueckheimer | |
| 5,682,439 A | 10/1997 | Beernink et al. | |
| 5,684,873 A | 11/1997 | Tiilikainen | |
| 5,684,891 A | 11/1997 | Tanaka et al. | |
| 5,687,254 A | 11/1997 | Poon et al. | |
| 5,692,073 A | 11/1997 | Cass | |
| 5,699,441 A | 12/1997 | Sagawa et al. | |
| 5,701,424 A | 12/1997 | Atkinson | |
| 5,701,497 A | 12/1997 | Yamauchi et al. | |
| 5,708,825 A | 1/1998 | Sotomayor | |
| 5,710,831 A | 1/1998 | Beernink et al. | |
| 5,713,045 A | 1/1998 | Berdahl | |
| 5,714,698 A | 2/1998 | Tokioka et al. | |
| 5,717,846 A | 2/1998 | Iida et al. | |
| 5,724,521 A | 3/1998 | Dedrick | |
| 5,724,985 A | 3/1998 | Snell et al. | |
| 5,732,214 A | 3/1998 | Subrahmanyam | |
| 5,732,227 A | 3/1998 | Kuzunuki et al. | |
| 5,734,923 A | 3/1998 | Sagawa et al. | |

(56) References Cited

U.S. PATENT DOCUMENTS

| | | | |
|---|---|---|---|
| 5,737,507 | A | 4/1998 | Smith |
| 5,745,116 | A | 4/1998 | Pisutha-Arnond |
| 5,748,805 | A | 5/1998 | Withgott et al. |
| 5,748,926 | A | 5/1998 | Fukuda et al. |
| 5,752,051 | A | 5/1998 | Cohen |
| 5,754,308 | A | 5/1998 | Lopresti et al. |
| 5,754,939 | A | 5/1998 | Herz et al. |
| 5,756,981 | A | 5/1998 | Roustaei et al. |
| 5,764,794 | A | 6/1998 | Perlin |
| 5,767,457 | A | 6/1998 | Gerpheide et al. |
| 5,768,418 | A | 6/1998 | Berman et al. |
| 5,768,607 | A | 6/1998 | Drews et al. |
| 5,774,357 | A | 6/1998 | Hoffberg et al. |
| 5,774,591 | A | 6/1998 | Black et al. |
| 5,777,614 | A | 7/1998 | Ando et al. |
| 5,781,662 | A | 7/1998 | Mori et al. |
| 5,781,723 | A | 7/1998 | Yee et al. |
| 5,784,061 | A | 7/1998 | Moran et al. |
| 5,784,504 | A | 7/1998 | Anderson et al. |
| 5,796,866 | A | 8/1998 | Sakurai et al. |
| 5,798,693 | A | 8/1998 | Engellenner |
| 5,798,758 | A | 8/1998 | Harada et al. |
| 5,799,219 | A | 8/1998 | Moghadam et al. |
| 5,805,167 | A | 9/1998 | Van Cruyningen |
| 5,809,172 | A | 9/1998 | Melen |
| 5,809,267 | A | 9/1998 | Moran et al. |
| 5,809,476 | A | 9/1998 | Ryan |
| 5,815,577 | A | 9/1998 | Clark |
| 5,818,612 | A * | 10/1998 | Segawa et al. ............... 358/494 |
| 5,818,965 | A | 10/1998 | Davies |
| 5,821,925 | A | 10/1998 | Carey et al. |
| 5,822,539 | A | 10/1998 | van Hoff |
| 5,825,943 | A | 10/1998 | DeVito et al. |
| 5,832,474 | A | 11/1998 | Lopresti et al. |
| 5,832,528 | A | 11/1998 | Kwatinetz et al. |
| 5,837,987 | A | 11/1998 | Koenck et al. |
| 5,838,326 | A | 11/1998 | Card et al. |
| 5,838,889 | A | 11/1998 | Booker |
| 5,845,301 | A | 12/1998 | Rivette et al. |
| 5,848,187 | A | 12/1998 | Bricklin et al. |
| 5,852,676 | A | 12/1998 | Lazar |
| 5,861,886 | A | 1/1999 | Moran et al. |
| 5,862,256 | A | 1/1999 | Zetts et al. |
| 5,862,260 | A | 1/1999 | Rhoads |
| 5,864,635 | A | 1/1999 | Zetts et al. |
| 5,864,848 | A | 1/1999 | Horvitz et al. |
| 5,867,150 | A | 2/1999 | Bricklin et al. |
| 5,867,597 | A | 2/1999 | Peairs et al. |
| 5,867,795 | A | 2/1999 | Novis et al. |
| 5,880,411 | A | 3/1999 | Gillespie et al. |
| 5,880,731 | A | 3/1999 | Liles et al. |
| 5,880,743 | A | 3/1999 | Moran et al. |
| 5,884,267 | A | 3/1999 | Goldenthal et al. |
| 5,889,236 | A | 3/1999 | Gillespie et al. |
| 5,889,523 | A | 3/1999 | Wilcox et al. |
| 5,889,896 | A | 3/1999 | Meshinsky et al. |
| 5,890,147 | A | 3/1999 | Peltonen et al. |
| 5,893,095 | A | 4/1999 | Jain et al. |
| 5,893,126 | A | 4/1999 | Drews et al. |
| 5,893,130 | A | 4/1999 | Inoue et al. |
| 5,895,470 | A | 4/1999 | Pirolli et al. |
| 5,899,700 | A | 5/1999 | Williams et al. |
| 5,905,251 | A | 5/1999 | Knowles |
| 5,907,328 | A | 5/1999 | Brush, II et al. |
| 5,913,185 | A | 6/1999 | Martino et al. |
| 5,917,491 | A | 6/1999 | Bauersfeld |
| 5,920,477 | A | 7/1999 | Hoffberg et al. |
| 5,920,694 | A | 7/1999 | Carleton et al. |
| 5,932,863 | A | 8/1999 | Rathus et al. |
| 5,933,829 | A | 8/1999 | Durst et al. |
| 5,937,422 | A | 8/1999 | Nelson et al. |
| 5,946,406 | A | 8/1999 | Frink et al. |
| 5,949,921 | A | 9/1999 | Kojima et al. |
| 5,952,599 | A | 9/1999 | Dolby et al. |
| 5,953,541 | A | 9/1999 | King et al. |
| 5,956,423 | A | 9/1999 | Frink et al. |
| 5,960,383 | A | 9/1999 | Fleischer |
| 5,963,966 | A | 10/1999 | Mitchell et al. |
| 5,966,126 | A | 10/1999 | Szabo |
| 5,970,455 | A | 10/1999 | Wilcox et al. |
| 5,982,853 | A | 11/1999 | Liebermann |
| 5,982,928 | A | 11/1999 | Shimada et al. |
| 5,982,929 | A | 11/1999 | Ilan et al. |
| 5,983,171 | A | 11/1999 | Yokoyama et al. |
| 5,983,295 | A | 11/1999 | Cotugno |
| 5,986,200 | A | 11/1999 | Curtin |
| 5,986,655 | A | 11/1999 | Chiu et al. |
| 5,990,878 | A | 11/1999 | Ikeda et al. |
| 5,990,893 | A | 11/1999 | Numazaki |
| 5,991,441 | A | 11/1999 | Jourjine |
| 5,995,643 | A | 11/1999 | Saito |
| 5,999,664 | A | 12/1999 | Mahoney et al. |
| 6,002,491 | A | 12/1999 | Li et al. |
| 6,002,798 | A | 12/1999 | Palmer et al. |
| 6,002,808 | A | 12/1999 | Freeman |
| 6,003,775 | A | 12/1999 | Ackley |
| 6,009,420 | A | 12/1999 | Fagg, III et al. |
| 6,011,905 | A | 1/2000 | Huttenlocher et al. |
| 6,012,071 | A | 1/2000 | Krishna et al. |
| 6,018,342 | A | 1/2000 | Bristor |
| 6,018,346 | A | 1/2000 | Moran et al. |
| 6,021,218 | A | 2/2000 | Capps et al. |
| 6,021,403 | A | 2/2000 | Horvitz et al. |
| 6,025,844 | A | 2/2000 | Parsons |
| 6,026,388 | A | 2/2000 | Liddy et al. |
| 6,028,271 | A | 2/2000 | Gillespie et al. |
| 6,029,141 | A | 2/2000 | Bezos et al. |
| 6,029,195 | A | 2/2000 | Herz |
| 6,031,525 | A | 2/2000 | Perlin |
| 6,033,086 | A * | 3/2000 | Bohn ............................ 362/235 |
| 6,036,086 | A | 3/2000 | Sizer, II et al. |
| 6,038,342 | A | 3/2000 | Bernzott et al. |
| 6,040,840 | A | 3/2000 | Koshiba et al. |
| 6,042,012 | A | 3/2000 | Olmstead et al. |
| 6,044,378 | A | 3/2000 | Gladney |
| 6,049,034 | A | 4/2000 | Cook |
| 6,049,327 | A | 4/2000 | Walker et al. |
| 6,052,481 | A | 4/2000 | Grajski et al. |
| 6,053,413 | A | 4/2000 | Swift et al. |
| 6,055,333 | A | 4/2000 | Guzik et al. |
| 6,055,513 | A | 4/2000 | Katz et al. |
| 6,057,844 | A | 5/2000 | Strauss |
| 6,057,845 | A | 5/2000 | Dupouy |
| 6,061,050 | A | 5/2000 | Allport et al. |
| 6,064,854 | A | 5/2000 | Peters et al. |
| 6,066,794 | A | 5/2000 | Longo |
| 6,069,622 | A | 5/2000 | Kurlander |
| 6,072,494 | A | 6/2000 | Nguyen |
| 6,072,502 | A | 6/2000 | Gupta |
| 6,075,895 | A | 6/2000 | Qiao et al. |
| 6,078,308 | A | 6/2000 | Rosenberg et al. |
| 6,081,621 | A | 6/2000 | Ackner |
| 6,081,629 | A | 6/2000 | Browning |
| 6,085,162 | A | 7/2000 | Cherny |
| 6,088,484 | A | 7/2000 | Mead |
| 6,088,731 | A | 7/2000 | Kiraly et al. |
| 6,092,038 | A | 7/2000 | Kanevsky et al. |
| 6,092,068 | A | 7/2000 | Dinkelacker |
| 6,094,689 | A | 7/2000 | Embry et al. |
| 6,095,418 | A | 8/2000 | Swartz et al. |
| 6,097,392 | A | 8/2000 | Leyerle |
| 6,098,106 | A | 8/2000 | Philyaw et al. |
| 6,104,401 | A | 8/2000 | Parsons |
| 6,104,845 | A | 8/2000 | Lipman et al. |
| 6,107,994 | A | 8/2000 | Harada et al. |
| 6,108,656 | A | 8/2000 | Durst et al. |
| 6,111,580 | A | 8/2000 | Kazama et al. |
| 6,111,588 | A | 8/2000 | Newell |
| 6,115,053 | A | 9/2000 | Perlin |
| 6,115,482 | A | 9/2000 | Sears et al. |
| 6,115,724 | A | 9/2000 | Booker |
| 6,118,888 | A | 9/2000 | Chino et al. |
| 6,118,899 | A | 9/2000 | Bloomfield et al. |
| D432,539 | S | 10/2000 | Philyaw |

(56) References Cited

U.S. PATENT DOCUMENTS

| | | |
|---|---|---|
| 6,128,003 A | 10/2000 | Smith et al. |
| 6,134,532 A | 10/2000 | Lazarus et al. |
| 6,138,915 A | 10/2000 | Danielson et al. |
| 6,140,140 A | 10/2000 | Hopper |
| 6,144,366 A | 11/2000 | Numazaki et al. |
| 6,145,003 A | 11/2000 | Sanu et al. |
| 6,147,678 A | 11/2000 | Kumar et al. |
| 6,151,208 A | 11/2000 | Bartlett |
| 6,154,222 A | 11/2000 | Haratsch et al. |
| 6,154,723 A | 11/2000 | Cox et al. |
| 6,154,737 A | 11/2000 | Inaba et al. |
| 6,154,758 A | 11/2000 | Chiang |
| 6,157,465 A | 12/2000 | Suda et al. |
| 6,157,935 A | 12/2000 | Tran et al. |
| 6,164,534 A | 12/2000 | Rathus et al. |
| 6,167,369 A | 12/2000 | Schulze |
| 6,169,969 B1 | 1/2001 | Cohen |
| 6,175,772 B1 | 1/2001 | Kamiya et al. |
| 6,175,922 B1 | 1/2001 | Wang |
| 6,178,261 B1 | 1/2001 | Williams et al. |
| 6,178,263 B1 | 1/2001 | Fan et al. |
| 6,181,343 B1 | 1/2001 | Lyons |
| 6,181,778 B1 | 1/2001 | Ohki et al. |
| 6,184,847 B1 | 2/2001 | Fateh et al. |
| 6,192,165 B1 | 2/2001 | Irons |
| 6,192,478 B1 | 2/2001 | Elledge |
| 6,195,104 B1 | 2/2001 | Lyons |
| 6,195,475 B1 | 2/2001 | Beausoleil, Jr. et al. |
| 6,199,048 B1 | 3/2001 | Hudetz et al. |
| 6,201,903 B1 | 3/2001 | Wolff et al. |
| 6,204,852 B1 | 3/2001 | Kumar et al. |
| 6,208,355 B1 | 3/2001 | Schuster |
| 6,208,435 B1 | 3/2001 | Zwolinski |
| 6,212,299 B1 | 4/2001 | Yuge |
| 6,215,890 B1 | 4/2001 | Matsuo et al. |
| 6,218,964 B1 | 4/2001 | Ellis |
| 6,219,057 B1 | 4/2001 | Carey et al. |
| 6,222,465 B1 | 4/2001 | Kumar et al. |
| 6,226,631 B1 | 5/2001 | Evans |
| 6,229,137 B1 | 5/2001 | Bohn |
| 6,229,542 B1 | 5/2001 | Miller |
| 6,233,591 B1 | 5/2001 | Sherman et al. |
| 6,240,207 B1 | 5/2001 | Shinozuka et al. |
| 6,243,683 B1 | 6/2001 | Peters |
| 6,244,873 B1 | 6/2001 | Hill et al. |
| 6,249,292 B1 | 6/2001 | Christian et al. |
| 6,249,606 B1 | 6/2001 | Kiraly et al. |
| 6,252,598 B1 | 6/2001 | Segen |
| 6,256,400 B1 | 7/2001 | Takata et al. |
| 6,265,844 B1 | 7/2001 | Wakefield |
| 6,269,187 B1 | 7/2001 | Frink et al. |
| 6,269,188 B1 | 7/2001 | Jamali |
| 6,270,013 B1 | 8/2001 | Lipman et al. |
| 6,285,794 B1 | 9/2001 | Georgiev et al. |
| 6,289,304 B1 | 9/2001 | Grefenstette |
| 6,292,274 B1 | 9/2001 | Bohn |
| 6,304,674 B1 | 10/2001 | Cass et al. |
| 6,307,952 B1 | 10/2001 | Dietz |
| 6,307,955 B1 | 10/2001 | Zank et al. |
| 6,310,971 B1 | 10/2001 | Shiiyama |
| 6,310,988 B1 | 10/2001 | Flores et al. |
| 6,311,152 B1 | 10/2001 | Bai et al. |
| 6,312,175 B1 | 11/2001 | Lum |
| 6,313,853 B1 | 11/2001 | Lamontagne et al. |
| 6,314,406 B1 | 11/2001 | O'Hagan et al. |
| 6,314,457 B1 | 11/2001 | Schena et al. |
| 6,316,710 B1 | 11/2001 | Lindemann |
| 6,317,132 B1 | 11/2001 | Perlin |
| 6,318,087 B1 | 11/2001 | Baumann et al. |
| 6,321,991 B1 | 11/2001 | Knowles |
| 6,323,846 B1 | 11/2001 | Westerman et al. |
| 6,326,962 B1 | 12/2001 | Szabo |
| 6,330,976 B1 | 12/2001 | Dymetman et al. |
| 6,335,725 B1 | 1/2002 | Koh et al. |
| 6,341,280 B1 | 1/2002 | Glass et al. |
| 6,341,290 B1 | 1/2002 | Lombardo et al. |
| 6,344,906 B1 | 2/2002 | Gatto et al. |
| 6,345,104 B1 | 2/2002 | Rhoads |
| 6,346,933 B1 | 2/2002 | Lin |
| 6,347,290 B1 | 2/2002 | Bartlett |
| 6,349,308 B1 | 2/2002 | Whang et al. |
| 6,351,222 B1 | 2/2002 | Swan et al. |
| 6,356,281 B1 | 3/2002 | Isenman |
| 6,356,899 B1 | 3/2002 | Chakrabarti et al. |
| 6,360,949 B1 * | 3/2002 | Shepard et al. ......... 235/462.43 |
| 6,360,951 B1 | 3/2002 | Swinehart |
| 6,363,160 B1 | 3/2002 | Bradski et al. |
| RE37,654 E | 4/2002 | Longo |
| 6,366,288 B1 | 4/2002 | Naruki et al. |
| 6,369,811 B1 | 4/2002 | Graham et al. |
| 6,377,296 B1 | 4/2002 | Zlatsin et al. |
| 6,377,712 B1 | 4/2002 | Georgiev et al. |
| 6,377,986 B1 | 4/2002 | Philyaw et al. |
| 6,378,075 B1 | 4/2002 | Goldstein et al. |
| 6,380,931 B1 | 4/2002 | Gillespie et al. |
| 6,381,602 B1 | 4/2002 | Shoroff et al. |
| 6,384,744 B1 | 5/2002 | Philyaw et al. |
| 6,384,829 B1 | 5/2002 | Prevost et al. |
| 6,393,443 B1 | 5/2002 | Rubin et al. |
| 6,396,523 B1 | 5/2002 | Segal et al. |
| 6,396,951 B1 | 5/2002 | Grefenstette |
| 6,400,845 B1 | 6/2002 | Volino |
| 6,404,438 B1 | 6/2002 | Hatlelid et al. |
| 6,408,257 B1 | 6/2002 | Harrington et al. |
| 6,409,401 B1 | 6/2002 | Petteruti et al. |
| 6,414,671 B1 | 7/2002 | Gillespie et al. |
| 6,417,797 B1 | 7/2002 | Cousins et al. |
| 6,418,433 B1 | 7/2002 | Chakrabarti et al. |
| 6,421,453 B1 | 7/2002 | Kanevsky et al. |
| 6,421,675 B1 | 7/2002 | Ryan et al. |
| 6,427,032 B1 | 7/2002 | Irons et al. |
| 6,429,899 B1 | 8/2002 | Nio et al. |
| 6,430,554 B1 | 8/2002 | Rothschild |
| 6,430,567 B2 | 8/2002 | Burridge |
| 6,433,784 B1 | 8/2002 | Merrick et al. |
| 6,434,561 B1 | 8/2002 | Durst, Jr. et al. |
| 6,434,581 B1 | 8/2002 | Forcier |
| 6,438,523 B1 | 8/2002 | Oberteuffer et al. |
| 6,448,979 B1 | 9/2002 | Schena et al. |
| 6,449,616 B1 | 9/2002 | Walker et al. |
| 6,454,626 B1 | 9/2002 | An |
| 6,459,823 B2 | 10/2002 | Altunbasak et al. |
| 6,460,036 B1 | 10/2002 | Herz |
| 6,466,198 B1 | 10/2002 | Feinstein |
| 6,466,336 B1 | 10/2002 | Sturgeon et al. |
| 6,476,830 B1 | 11/2002 | Farmer et al. |
| 6,476,834 B1 | 11/2002 | Doval et al. |
| 6,477,239 B1 | 11/2002 | Ohki et al. |
| 6,483,513 B1 | 11/2002 | Haratsch et al. |
| 6,484,156 B1 | 11/2002 | Gupta et al. |
| 6,486,874 B1 | 11/2002 | Muthuswamy et al. |
| 6,486,892 B1 | 11/2002 | Stern |
| 6,489,970 B1 | 12/2002 | Pazel |
| 6,490,553 B2 | 12/2002 | Van Thong et al. |
| 6,491,217 B2 | 12/2002 | Catan |
| 6,493,707 B1 | 12/2002 | Dey et al. |
| 6,498,970 B2 | 12/2002 | Colmenarez et al. |
| 6,504,138 B1 | 1/2003 | Mangerson |
| 6,507,349 B1 | 1/2003 | Balassanian |
| 6,508,706 B2 | 1/2003 | Sitrick et al. |
| 6,509,707 B2 | 1/2003 | Yamashita et al. |
| 6,509,912 B1 | 1/2003 | Moran et al. |
| 6,510,387 B2 | 1/2003 | Fuchs et al. |
| 6,510,417 B1 | 1/2003 | Quilici et al. |
| 6,518,950 B1 | 2/2003 | Dougherty et al. |
| 6,520,407 B1 | 2/2003 | Nieswand et al. |
| 6,522,333 B1 | 2/2003 | Hatlelid et al. |
| 6,525,749 B1 | 2/2003 | Moran et al. |
| 6,526,395 B1 | 2/2003 | Morris |
| 6,526,449 B1 | 2/2003 | Philyaw et al. |
| 6,532,007 B1 | 3/2003 | Matsuda |
| 6,537,324 B1 | 3/2003 | Tabata et al. |
| 6,538,187 B2 | 3/2003 | Beigi |
| 6,539,931 B2 | 4/2003 | Trajkovic et al. |

(56) References Cited

U.S. PATENT DOCUMENTS

| | | |
|---|---|---|
| 6,540,141 B1 | 4/2003 | Dougherty et al. |
| 6,542,933 B1 | 4/2003 | Durst, Jr. et al. |
| 6,543,052 B1 | 4/2003 | Ogasawara |
| 6,545,669 B1 | 4/2003 | Kinawi et al. |
| 6,546,385 B1 | 4/2003 | Mao et al. |
| 6,546,405 B2 | 4/2003 | Gupta et al. |
| 6,549,751 B1 | 4/2003 | Mandri |
| 6,549,891 B1 | 4/2003 | Rauber et al. |
| 6,554,433 B1 | 4/2003 | Holler |
| 6,560,281 B1 | 5/2003 | Black et al. |
| 6,564,144 B1 | 5/2003 | Cherveny |
| 6,570,555 B1 | 5/2003 | Prevost et al. |
| 6,571,193 B1 | 5/2003 | Unuma et al. |
| 6,571,235 B1 | 5/2003 | Marpe et al. |
| 6,573,883 B1 | 6/2003 | Bartlett |
| 6,577,329 B1 | 6/2003 | Flickner et al. |
| 6,577,953 B1 | 6/2003 | Swope et al. |
| 6,587,835 B1 | 7/2003 | Treyz et al. |
| 6,593,723 B1 | 7/2003 | Johnson |
| 6,594,616 B2 | 7/2003 | Zhang et al. |
| 6,594,705 B1 | 7/2003 | Philyaw |
| 6,597,443 B2 | 7/2003 | Boman |
| 6,597,812 B1 | 7/2003 | Fallon et al. |
| 6,599,130 B2 | 7/2003 | Moehrle |
| 6,600,475 B2 | 7/2003 | Gutta et al. |
| 6,610,936 B2 | 8/2003 | Gillespie et al. |
| 6,611,598 B1 | 8/2003 | Hayosh |
| 6,615,136 B1 | 9/2003 | Swope et al. |
| 6,615,268 B1 | 9/2003 | Philyaw et al. |
| 6,616,038 B1 | 9/2003 | Olschafskie et al. |
| 6,616,047 B2 | 9/2003 | Catan |
| 6,617,369 B2 | 9/2003 | Parfondry et al. |
| 6,618,504 B1 | 9/2003 | Yoshino |
| 6,618,732 B1 | 9/2003 | White et al. |
| 6,622,165 B1 | 9/2003 | Philyaw |
| 6,624,833 B1 | 9/2003 | Kumar et al. |
| 6,625,335 B1 | 9/2003 | Kanai |
| 6,625,581 B1 | 9/2003 | Perkowski |
| 6,628,295 B2 | 9/2003 | Wilensky |
| 6,629,133 B1 | 9/2003 | Philyaw et al. |
| 6,630,924 B1 | 10/2003 | Peck |
| 6,631,404 B1 | 10/2003 | Philyaw |
| 6,636,763 B1 | 10/2003 | Junker et al. |
| 6,636,892 B1 | 10/2003 | Philyaw |
| 6,636,896 B1 | 10/2003 | Philyaw |
| 6,638,314 B1 | 10/2003 | Meyerzon et al. |
| 6,638,317 B2 | 10/2003 | Nakao |
| 6,640,145 B2 | 10/2003 | Hoffberg et al. |
| 6,641,037 B2 | 11/2003 | Williams |
| 6,643,661 B2 | 11/2003 | Polizzi et al. |
| 6,643,692 B1 | 11/2003 | Philyaw et al. |
| 6,643,696 B2 | 11/2003 | Davis et al. |
| 6,650,761 B1 | 11/2003 | Rodriguez et al. |
| 6,651,053 B1 | 11/2003 | Rothschild |
| 6,658,151 B2 | 12/2003 | Lee et al. |
| 6,661,919 B2 | 12/2003 | Nicholson et al. |
| 6,664,991 B1 | 12/2003 | Chew et al. |
| 6,669,088 B2 | 12/2003 | Veeneman |
| 6,671,684 B1 | 12/2003 | Hull et al. |
| 6,677,969 B1 | 1/2004 | Hongo |
| 6,678,075 B1 | 1/2004 | Tsai et al. |
| 6,678,664 B1 | 1/2004 | Ganesan |
| 6,678,687 B2 | 1/2004 | Watanabe et al. |
| 6,681,031 B2 | 1/2004 | Cohen et al. |
| 6,686,844 B2 | 2/2004 | Watanabe et al. |
| 6,687,612 B2 | 2/2004 | Cherveny |
| 6,688,081 B2 | 2/2004 | Boyd |
| 6,688,522 B1 | 2/2004 | Philyaw et al. |
| 6,688,523 B1 | 2/2004 | Koenck |
| 6,688,525 B1 | 2/2004 | Nelson et al. |
| 6,690,358 B2 | 2/2004 | Kaplan |
| 6,691,107 B1 | 2/2004 | Dockter et al. |
| 6,691,123 B1 | 2/2004 | Guliksen |
| 6,691,151 B1 | 2/2004 | Cheyer et al. |
| 6,691,194 B1 | 2/2004 | Ofer |
| 6,691,914 B2 | 2/2004 | Isherwood et al. |
| 6,692,259 B2 | 2/2004 | Kumar et al. |
| 6,694,356 B1 | 2/2004 | Philyaw |
| 6,697,838 B1 | 2/2004 | Jakobson |
| 6,697,949 B1 | 2/2004 | Philyaw et al. |
| H2098 H | 3/2004 | Morin |
| 6,701,354 B1 | 3/2004 | Philyaw et al. |
| 6,701,369 B1 | 3/2004 | Philyaw |
| 6,704,024 B2 | 3/2004 | Robotham et al. |
| 6,704,699 B2 | 3/2004 | Nir |
| 6,707,581 B1 | 3/2004 | Browning |
| 6,708,208 B1 | 3/2004 | Philyaw |
| 6,714,677 B1 | 3/2004 | Stearns et al. |
| 6,714,969 B1 | 3/2004 | Klein et al. |
| 6,718,308 B1 | 4/2004 | Nolting |
| 6,720,984 B1 | 4/2004 | Jorgensen et al. |
| 6,721,921 B1 | 4/2004 | Altman |
| 6,725,125 B2 | 4/2004 | Basson et al. |
| 6,725,203 B1 | 4/2004 | Seet et al. |
| 6,725,260 B1 | 4/2004 | Philyaw |
| 6,728,000 B1 | 4/2004 | Lapstun et al. |
| 6,735,632 B1 | 5/2004 | Kiraly et al. |
| 6,738,519 B1 | 5/2004 | Nishiwaki |
| 6,741,745 B2 | 5/2004 | Dance et al. |
| 6,741,871 B1 | 5/2004 | Silverbrook et al. |
| 6,744,938 B1 | 6/2004 | Rantze et al. |
| 6,745,234 B1 | 6/2004 | Philyaw et al. |
| 6,745,937 B2 | 6/2004 | Walsh et al. |
| 6,747,632 B2 | 6/2004 | Howard |
| 6,748,306 B2 | 6/2004 | Lipowicz |
| 6,750,852 B2 | 6/2004 | Gillespie et al. |
| 6,752,317 B2 | 6/2004 | Dymetman et al. |
| 6,752,498 B2 | 6/2004 | Covannon et al. |
| 6,753,883 B2 | 6/2004 | Schena et al. |
| 6,754,632 B1 | 6/2004 | Kalinowski et al. |
| 6,754,698 B1 | 6/2004 | Philyaw et al. |
| 6,757,715 B1 | 6/2004 | Philyaw |
| 6,757,783 B2 | 6/2004 | Koh |
| 6,758,398 B1 | 7/2004 | Philyaw et al. |
| 6,760,661 B2 | 7/2004 | Klein et al. |
| 6,763,386 B2 | 7/2004 | Davis et al. |
| 6,766,494 B1 | 7/2004 | Price et al. |
| 6,766,956 B1 | 7/2004 | Boylan, III et al. |
| 6,771,283 B2 | 8/2004 | Carro |
| 6,772,047 B2 | 8/2004 | Butikofer |
| 6,772,338 B1 | 8/2004 | Hull |
| 6,773,177 B2 | 8/2004 | Denoue et al. |
| 6,775,422 B1 | 8/2004 | Altman |
| 6,778,988 B2 | 8/2004 | Bengtson |
| 6,783,071 B2 | 8/2004 | Levine et al. |
| 6,785,421 B1 | 8/2004 | Gindele et al. |
| 6,786,793 B1 | 9/2004 | Wang |
| 6,788,809 B1 | 9/2004 | Grzeszczuk et al. |
| 6,788,815 B2 | 9/2004 | Lui et al. |
| 6,791,536 B2 | 9/2004 | Keely et al. |
| 6,791,588 B1 | 9/2004 | Philyaw |
| 6,792,112 B1 | 9/2004 | Campbell et al. |
| 6,792,452 B1 | 9/2004 | Philyaw |
| 6,798,429 B2 | 9/2004 | Bradski |
| 6,801,637 B2 | 10/2004 | Voronka et al. |
| 6,801,658 B2 | 10/2004 | Morita et al. |
| 6,801,907 B1 | 10/2004 | Zagami |
| 6,804,396 B2 | 10/2004 | Higaki et al. |
| 6,804,659 B1 | 10/2004 | Graham et al. |
| 6,812,961 B1 | 11/2004 | Parulski et al. |
| 6,813,039 B1 | 11/2004 | Silverbrook et al. |
| 6,816,894 B1 | 11/2004 | Philyaw et al. |
| 6,820,237 B1 | 11/2004 | Abu-Hakima et al. |
| 6,822,639 B1 | 11/2004 | Silverbrook et al. |
| 6,823,075 B2 | 11/2004 | Perry |
| 6,823,388 B1 | 11/2004 | Philyaw et al. |
| 6,824,044 B1 | 11/2004 | Lapstun et al. |
| 6,824,057 B2 | 11/2004 | Rathus et al. |
| 6,825,956 B2 | 11/2004 | Silverbrook et al. |
| 6,826,592 B1 | 11/2004 | Philyaw et al. |
| 6,827,259 B2 | 12/2004 | Rathus et al. |
| 6,827,267 B2 | 12/2004 | Rathus et al. |
| 6,829,650 B1 | 12/2004 | Philyaw et al. |
| 6,830,187 B2 | 12/2004 | Rathus et al. |

(56) References Cited

U.S. PATENT DOCUMENTS

| | | |
|---|---|---|
| 6,830,188 B2 | 12/2004 | Rathus et al. |
| 6,832,116 B1 | 12/2004 | Tillgren et al. |
| 6,833,936 B1 | 12/2004 | Seymour |
| 6,834,804 B2 | 12/2004 | Rathus et al. |
| 6,836,799 B1 | 12/2004 | Philyaw et al. |
| 6,837,436 B2 | 1/2005 | Swartz et al. |
| 6,845,913 B2 | 1/2005 | Madding et al. |
| 6,850,252 B1 | 2/2005 | Hoffberg |
| 6,854,642 B2 | 2/2005 | Metcalf et al. |
| 6,862,046 B2 | 3/2005 | Ko |
| 6,865,284 B2 | 3/2005 | Mahoney et al. |
| 6,868,193 B1 | 3/2005 | Gharbia et al. |
| 6,877,001 B2 | 4/2005 | Wolf et al. |
| 6,879,957 B1 | 4/2005 | Pechter et al. |
| 6,880,122 B1 | 4/2005 | Lee et al. |
| 6,880,124 B1 | 4/2005 | Moore |
| 6,886,104 B1 | 4/2005 | McClurg et al. |
| 6,889,896 B2 | 5/2005 | Silverbrook et al. |
| 6,892,264 B2 | 5/2005 | Lamb |
| 6,898,592 B2 | 5/2005 | Peltonen et al. |
| 6,904,171 B2 | 6/2005 | van Zee |
| 6,917,722 B1 | 7/2005 | Bloomfield |
| 6,917,724 B2 | 7/2005 | Seder et al. |
| 6,920,431 B2 | 7/2005 | Showghi et al. |
| 6,922,725 B2 | 7/2005 | Lamming et al. |
| 6,925,182 B1 | 8/2005 | Epstein |
| 6,931,592 B1 | 8/2005 | Ramaley et al. |
| 6,938,024 B1 | 8/2005 | Horvitz |
| 6,947,571 B1 | 9/2005 | Rhoads et al. |
| 6,947,930 B2 | 9/2005 | Anick et al. |
| 6,952,281 B1 | 10/2005 | Irons et al. |
| 6,957,384 B2 | 10/2005 | Jeffery et al. |
| 6,970,915 B1 | 11/2005 | Partovi et al. |
| 6,978,297 B1 | 12/2005 | Piersol |
| 6,985,169 B1 | 1/2006 | Deng et al. |
| 6,985,962 B2 | 1/2006 | Philyaw |
| 6,990,548 B1 | 1/2006 | Kaylor |
| 6,991,158 B2 | 1/2006 | Munte |
| 6,992,655 B2 | 1/2006 | Ericson et al. |
| 6,993,580 B2 | 1/2006 | Isherwood et al. |
| 7,001,681 B2 | 2/2006 | Wood |
| 7,004,390 B2 | 2/2006 | Silverbrook et al. |
| 7,006,881 B1 | 2/2006 | Hoffberg et al. |
| 7,010,616 B2 | 3/2006 | Carlson et al. |
| 7,016,084 B2 | 3/2006 | Tsai |
| 7,016,532 B2 | 3/2006 | Boncyk et al. |
| 7,020,663 B2 | 3/2006 | Hay et al. |
| 7,043,489 B1 | 5/2006 | Kelley |
| 7,047,491 B2 | 5/2006 | Schubert et al. |
| 7,051,943 B2 | 5/2006 | Leone et al. |
| 7,057,607 B2 | 6/2006 | Mayoraz et al. |
| 7,058,223 B2 | 6/2006 | Cox |
| 7,062,437 B2 | 6/2006 | Kovales et al. |
| 7,062,706 B2 | 6/2006 | Maxwell et al. |
| 7,066,391 B2 | 6/2006 | Tsikos et al. |
| 7,069,240 B2 | 6/2006 | Spero et al. |
| 7,069,272 B2 | 6/2006 | Snyder |
| 7,069,582 B2 | 6/2006 | Philyaw et al. |
| 7,079,713 B2 | 7/2006 | Simmons |
| 7,085,755 B2 | 8/2006 | Bluhm et al. |
| 7,089,330 B1 | 8/2006 | Mason |
| 7,093,759 B2 | 8/2006 | Walsh |
| 7,096,218 B2 | 8/2006 | Schirmer et al. |
| 7,103,848 B2 | 9/2006 | Barsness et al. |
| 7,110,576 B2 | 9/2006 | Norris, Jr. et al. |
| 7,111,787 B2 | 9/2006 | Ehrhart |
| 7,117,374 B2 | 10/2006 | Hill et al. |
| 7,121,469 B2 | 10/2006 | Dorai et al. |
| 7,124,093 B1 | 10/2006 | Graham et al. |
| 7,130,885 B2 | 10/2006 | Chandra et al. |
| 7,131,061 B2 | 10/2006 | MacLean et al. |
| 7,133,862 B2 | 11/2006 | Hubert et al. |
| 7,136,530 B2 | 11/2006 | Lee et al. |
| 7,136,814 B1 | 11/2006 | McConnell |
| 7,137,077 B2 | 11/2006 | Iwema et al. |
| 7,139,445 B2 | 11/2006 | Pilu et al. |
| 7,151,864 B2 | 12/2006 | Henry et al. |
| 7,165,268 B1 | 1/2007 | Moore et al. |
| 7,167,586 B2 | 1/2007 | Braun et al. |
| 7,174,054 B2 | 2/2007 | Manber et al. |
| 7,174,332 B2 | 2/2007 | Baxter et al. |
| 7,181,761 B2 | 2/2007 | Davis et al. |
| 7,185,275 B2 | 2/2007 | Roberts et al. |
| 7,188,307 B2 | 3/2007 | Ohsawa |
| 7,190,480 B2 | 3/2007 | Sturgeon et al. |
| 7,197,716 B2 | 3/2007 | Newell et al. |
| 7,203,158 B2 | 4/2007 | Oshima et al. |
| 7,216,121 B2 | 5/2007 | Bachman et al. |
| 7,216,224 B2 | 5/2007 | Lapstun et al. |
| 7,224,480 B2 | 5/2007 | Tanaka et al. |
| 7,224,820 B2 | 5/2007 | Inomata et al. |
| 7,225,979 B2 | 6/2007 | Silverbrook et al. |
| 7,234,645 B2 | 6/2007 | Silverbrook et al. |
| 7,239,747 B2 | 7/2007 | Bresler et al. |
| 7,240,843 B2 | 7/2007 | Paul et al. |
| 7,242,492 B2 | 7/2007 | Currans et al. |
| 7,246,118 B2 | 7/2007 | Chastain et al. |
| 7,257,567 B2 | 8/2007 | Toshima |
| 7,260,534 B2 | 8/2007 | Gandhi et al. |
| 7,262,798 B2 | 8/2007 | Stavely et al. |
| 7,263,521 B2 | 8/2007 | Carpentier et al. |
| 7,275,049 B2 | 9/2007 | Clausner et al. |
| 7,277,925 B2 | 10/2007 | Warnock |
| 7,283,974 B2 | 10/2007 | Katz et al. |
| 7,283,992 B2 | 10/2007 | Liu et al. |
| 7,284,192 B2 | 10/2007 | Kashi et al. |
| 7,289,806 B2 | 10/2007 | Morris et al. |
| 7,295,101 B2 | 11/2007 | Ward et al. |
| 7,299,186 B2 | 11/2007 | Kuzunuki et al. |
| 7,299,969 B2 | 11/2007 | Paul et al. |
| 7,308,483 B2 | 12/2007 | Philyaw |
| 7,318,106 B2 | 1/2008 | Philyaw |
| 7,331,523 B2 | 2/2008 | Meier et al. |
| 7,339,467 B2 | 3/2008 | Lamb |
| 7,349,552 B2 | 3/2008 | Levy et al. |
| 7,353,199 B1 | 4/2008 | DiStefano, III |
| 7,362,902 B1 | 4/2008 | Baker et al. |
| 7,373,345 B2 | 5/2008 | Carpentier et al. |
| 7,376,581 B2 | 5/2008 | DeRose et al. |
| 7,377,421 B2 | 5/2008 | Rhoads |
| 7,383,263 B2 | 6/2008 | Goger |
| 7,385,736 B2 | 6/2008 | Tseng et al. |
| 7,392,287 B2 | 6/2008 | Ratcliff, III |
| 7,392,475 B1 | 6/2008 | Leban et al. |
| 7,404,520 B2 | 7/2008 | Vesuna |
| 7,409,434 B2 | 8/2008 | Lamming et al. |
| 7,412,158 B2 | 8/2008 | Kakkori |
| 7,415,670 B2 | 8/2008 | Hull et al. |
| 7,421,155 B2 | 9/2008 | King et al. |
| 7,424,543 B2 | 9/2008 | Rice, III |
| 7,424,618 B2 | 9/2008 | Roy et al. |
| 7,426,486 B2 | 9/2008 | Treibach-Heck et al. |
| 7,433,068 B2 | 10/2008 | Stevens et al. |
| 7,433,893 B2 | 10/2008 | Lowry |
| 7,437,023 B2 | 10/2008 | King et al. |
| 7,437,351 B2 | 10/2008 | Page |
| 7,437,475 B2 | 10/2008 | Philyaw |
| 7,477,780 B2 | 1/2009 | Boncyk et al. |
| 7,477,783 B2 | 1/2009 | Nakayama |
| 7,477,909 B2 | 1/2009 | Roth |
| 7,487,112 B2 | 2/2009 | Barnes, Jr. |
| 7,493,487 B2 | 2/2009 | Phillips et al. |
| 7,496,638 B2 | 2/2009 | Philyaw |
| 7,505,785 B2 | 3/2009 | Callaghan et al. |
| 7,505,956 B2 | 3/2009 | Ibbotson |
| 7,506,250 B2 | 3/2009 | Hull et al. |
| 7,512,254 B2 | 3/2009 | Vollkommer et al. |
| 7,519,397 B2 | 4/2009 | Fournier et al. |
| 7,523,067 B1 | 4/2009 | Nakajima |
| 7,523,126 B2 | 4/2009 | Rivette et al. |
| 7,533,040 B2 | 5/2009 | Perkowski |
| 7,536,547 B2 | 5/2009 | Van Den Tillaart |
| 7,542,966 B2 | 6/2009 | Wolf et al. |
| 7,552,075 B1 | 6/2009 | Walsh |

(56) References Cited

U.S. PATENT DOCUMENTS

| | | |
|---|---|---|
| 7,552,381 B2 | 6/2009 | Barrus |
| 7,561,312 B1 * | 7/2009 | Proudfoot et al. ............ 358/475 |
| 7,574,407 B2 | 8/2009 | Carro et al. |
| 7,587,412 B2 | 9/2009 | Weyl et al. |
| 7,591,597 B2 | 9/2009 | Pasqualini et al. |
| 7,593,605 B2 | 9/2009 | King et al. |
| 7,596,269 B2 | 9/2009 | King et al. |
| 7,599,580 B2 | 10/2009 | King et al. |
| 7,599,844 B2 | 10/2009 | King et al. |
| 7,599,855 B2 | 10/2009 | Sussman |
| 7,606,741 B2 | 10/2009 | King et al. |
| 7,613,634 B2 | 11/2009 | Siegel et al. |
| 7,616,840 B2 | 11/2009 | Erol et al. |
| 7,634,407 B2 | 12/2009 | Chelba et al. |
| 7,634,468 B2 | 12/2009 | Stephan |
| 7,647,349 B2 | 1/2010 | Hubert et al. |
| 7,660,813 B2 | 2/2010 | Milic-Frayling et al. |
| 7,664,734 B2 | 2/2010 | Lawrence et al. |
| 7,672,543 B2 | 3/2010 | Hull et al. |
| 7,672,931 B2 | 3/2010 | Hurst-Hiller et al. |
| 7,680,067 B2 | 3/2010 | Prasad et al. |
| 7,689,712 B2 | 3/2010 | Lee et al. |
| 7,689,832 B2 | 3/2010 | Talmor et al. |
| 7,698,344 B2 | 4/2010 | Sareen et al. |
| 7,702,624 B2 | 4/2010 | King et al. |
| 7,706,611 B2 | 4/2010 | King et al. |
| 7,707,039 B2 | 4/2010 | King et al. |
| 7,710,598 B2 | 5/2010 | Harrison, Jr. |
| 7,742,953 B2 | 6/2010 | King et al. |
| 7,761,451 B2 | 7/2010 | Cunningham |
| 7,779,002 B1 | 8/2010 | Gomes et al. |
| 7,783,617 B2 | 8/2010 | Lu et al. |
| 7,788,248 B2 | 8/2010 | Forstall et al. |
| 7,793,326 B2 | 9/2010 | McCoskey et al. |
| 7,796,116 B2 | 9/2010 | Salsman et al. |
| 7,806,322 B2 | 10/2010 | Brundage et al. |
| 7,812,860 B2 | 10/2010 | King et al. |
| 7,818,178 B2 | 10/2010 | Overend et al. |
| 7,818,215 B2 | 10/2010 | King et al. |
| 7,831,912 B2 | 11/2010 | King et al. |
| 7,844,907 B2 | 11/2010 | Watler et al. |
| 7,870,199 B2 | 1/2011 | Galli et al. |
| 7,872,669 B2 | 1/2011 | Darrell et al. |
| 7,894,670 B2 | 2/2011 | King et al. |
| 7,941,433 B2 | 5/2011 | Benson |
| 7,949,191 B1 | 5/2011 | Ramkumar et al. |
| 8,082,258 B2 | 12/2011 | Kumar et al. |
| 8,146,156 B2 | 3/2012 | King et al. |
| 2001/0001854 A1 | 5/2001 | Schena et al. |
| 2001/0003176 A1 | 6/2001 | Schena et al. |
| 2001/0003177 A1 | 6/2001 | Schena et al. |
| 2001/0032252 A1 | 10/2001 | Durst, Jr. et al. |
| 2001/0034237 A1 | 10/2001 | Garahi |
| 2001/0049636 A1 | 12/2001 | Hudda et al. |
| 2001/0053252 A1 | 12/2001 | Creque |
| 2001/0055411 A1 | 12/2001 | Black |
| 2001/0056463 A1 | 12/2001 | Grady et al. |
| 2002/0002504 A1 | 1/2002 | Engel et al. |
| 2002/0012065 A1 | 1/2002 | Watanabe |
| 2002/0013781 A1 | 1/2002 | Petersen |
| 2002/0016750 A1 | 2/2002 | Attia |
| 2002/0022993 A1 | 2/2002 | Miller et al. |
| 2002/0023215 A1 | 2/2002 | Wang et al. |
| 2002/0023957 A1 | 2/2002 | Michaelis et al. |
| 2002/0023959 A1 | 2/2002 | Miller et al. |
| 2002/0029350 A1 | 3/2002 | Cooper et al. |
| 2002/0038456 A1 | 3/2002 | Hansen et al. |
| 2002/0049781 A1 | 4/2002 | Bengtson |
| 2002/0051262 A1 | 5/2002 | Nuttall et al. |
| 2002/0052747 A1 | 5/2002 | Sarukkai |
| 2002/0054059 A1 | 5/2002 | Schneiderman |
| 2002/0055906 A1 | 5/2002 | Katz et al. |
| 2002/0055919 A1 | 5/2002 | Mikheev |
| 2002/0067308 A1 | 6/2002 | Robertson |
| 2002/0073000 A1 | 6/2002 | Sage |
| 2002/0091569 A1 | 7/2002 | Kitaura et al. |
| 2002/0091928 A1 | 7/2002 | Bouchard et al. |
| 2002/0099812 A1 | 7/2002 | Davis et al. |
| 2002/0102966 A1 | 8/2002 | Lev et al. |
| 2002/0111960 A1 | 8/2002 | Irons et al. |
| 2002/0125411 A1 * | 9/2002 | Christy ........................ 250/225 |
| 2002/0135815 A1 | 9/2002 | Finn |
| 2002/0154817 A1 | 10/2002 | Katsuyama et al. |
| 2002/0169509 A1 * | 11/2002 | Huang et al. ..................... 700/66 |
| 2002/0191847 A1 | 12/2002 | Newman et al. |
| 2002/0194143 A1 | 12/2002 | Banerjee et al. |
| 2002/0199198 A1 | 12/2002 | Stonedahl |
| 2003/0001018 A1 | 1/2003 | Hussey et al. |
| 2003/0004724 A1 | 1/2003 | Kahn et al. |
| 2003/0004991 A1 | 1/2003 | Keskar et al. |
| 2003/0009495 A1 | 1/2003 | Adjaoute |
| 2003/0019939 A1 | 1/2003 | Sellen |
| 2003/0039411 A1 * | 2/2003 | Nada ........................... 382/313 |
| 2003/0040957 A1 | 2/2003 | Rodriguez et al. |
| 2003/0043042 A1 | 3/2003 | Moores, Jr. et al. |
| 2003/0093384 A1 | 5/2003 | Durst, Jr. et al. |
| 2003/0093400 A1 | 5/2003 | Santosuosso |
| 2003/0093545 A1 | 5/2003 | Liu et al. |
| 2003/0098352 A1 | 5/2003 | Schnee et al. |
| 2003/0144865 A1 | 7/2003 | Lin et al. |
| 2003/0149678 A1 | 8/2003 | Cook |
| 2003/0160975 A1 | 8/2003 | Skurdal et al. |
| 2003/0171910 A1 | 9/2003 | Abir |
| 2003/0173405 A1 | 9/2003 | Wilz, Sr. et al. |
| 2003/0182399 A1 | 9/2003 | Silber |
| 2003/0187751 A1 | 10/2003 | Watson et al. |
| 2003/0187886 A1 | 10/2003 | Hull et al. |
| 2003/0195851 A1 | 10/2003 | Ong |
| 2003/0200152 A1 | 10/2003 | Divekar |
| 2003/0212527 A1 | 11/2003 | Moore et al. |
| 2003/0214528 A1 | 11/2003 | Pierce et al. |
| 2003/0220835 A1 | 11/2003 | Barnes, Jr. |
| 2003/0223637 A1 | 12/2003 | Simske et al. |
| 2003/0225547 A1 | 12/2003 | Paradies |
| 2004/0001217 A1 | 1/2004 | Wu |
| 2004/0006509 A1 | 1/2004 | Mannik et al. |
| 2004/0006740 A1 | 1/2004 | Krohn et al. |
| 2004/0015437 A1 | 1/2004 | Choi et al. |
| 2004/0023200 A1 | 2/2004 | Blume |
| 2004/0028295 A1 * | 2/2004 | Allen et al. ..................... 382/313 |
| 2004/0036718 A1 | 2/2004 | Warren et al. |
| 2004/0044576 A1 | 3/2004 | Kurihara et al. |
| 2004/0044627 A1 | 3/2004 | Russell et al. |
| 2004/0044952 A1 | 3/2004 | Jiang et al. |
| 2004/0064453 A1 | 4/2004 | Ruiz et al. |
| 2004/0068483 A1 | 4/2004 | Sakurai et al. |
| 2004/0073874 A1 | 4/2004 | Poibeau et al. |
| 2004/0098165 A1 | 5/2004 | Butikofer |
| 2004/0128514 A1 | 7/2004 | Rhoads |
| 2004/0139106 A1 | 7/2004 | Bachman et al. |
| 2004/0139107 A1 | 7/2004 | Bachman et al. |
| 2004/0139400 A1 | 7/2004 | Allam et al. |
| 2004/0158492 A1 | 8/2004 | Lopez et al. |
| 2004/0181688 A1 | 9/2004 | Wittkotter |
| 2004/0186766 A1 | 9/2004 | Fellenstein et al. |
| 2004/0186859 A1 | 9/2004 | Butcher |
| 2004/0189691 A1 | 9/2004 | Jojic et al. |
| 2004/0193488 A1 | 9/2004 | Khoo et al. |
| 2004/0204953 A1 | 10/2004 | Muir et al. |
| 2004/0205534 A1 | 10/2004 | Koelle |
| 2004/0206809 A1 | 10/2004 | Wood et al. |
| 2004/0229194 A1 | 11/2004 | Yang |
| 2004/0236791 A1 | 11/2004 | Kinjo |
| 2004/0250201 A1 | 12/2004 | Caspi |
| 2004/0254795 A1 | 12/2004 | Fujii et al. |
| 2004/0256454 A1 | 12/2004 | Kocher |
| 2004/0258274 A1 | 12/2004 | Brundage et al. |
| 2004/0260470 A1 | 12/2004 | Rast |
| 2004/0260618 A1 | 12/2004 | Larson |
| 2004/0267734 A1 | 12/2004 | Toshima |
| 2004/0268237 A1 | 12/2004 | Jones et al. |
| 2005/0005168 A1 | 1/2005 | Dick |
| 2005/0022114 A1 | 1/2005 | Shanahan et al. |
| 2005/0033713 A1 | 2/2005 | Bala et al. |

(56) References Cited

U.S. PATENT DOCUMENTS

| | | | |
|---|---|---|---|
| 2005/0076095 A1 | 4/2005 | Mathew et al. | |
| 2005/0091578 A1 | 4/2005 | Madan et al. | |
| 2005/0097335 A1 | 5/2005 | Shenoy et al. | |
| 2005/0108001 A1 | 5/2005 | Aarskog | |
| 2005/0108195 A1 | 5/2005 | Yalovsky et al. | |
| 2005/0132281 A1 | 6/2005 | Pan et al. | |
| 2005/0136949 A1 | 6/2005 | Barnes, Jr. | |
| 2005/0139649 A1 | 6/2005 | Metcalf et al. | |
| 2005/0144074 A1 | 6/2005 | Fredregill et al. | |
| 2005/0149538 A1 | 7/2005 | Singh et al. | |
| 2005/0154760 A1 | 7/2005 | Bhakta et al. | |
| 2005/0205671 A1* | 9/2005 | Gelsomini et al. | 235/384 |
| 2005/0214730 A1 | 9/2005 | Rines | |
| 2005/0220359 A1 | 10/2005 | Sun et al. | |
| 2005/0222801 A1 | 10/2005 | Wulff et al. | |
| 2005/0228683 A1 | 10/2005 | Saylor et al. | |
| 2005/0231746 A1 | 10/2005 | Parry et al. | |
| 2005/0243386 A1* | 11/2005 | Sheng | 358/506 |
| 2005/0251448 A1 | 11/2005 | Gropper | |
| 2005/0262058 A1 | 11/2005 | Chandrasekar et al. | |
| 2005/0270358 A1* | 12/2005 | Kuchen et al. | 347/130 |
| 2005/0278314 A1 | 12/2005 | Buchheit | |
| 2005/0288954 A1 | 12/2005 | McCarthy et al. | |
| 2005/0289054 A1 | 12/2005 | Silverbrook et al. | |
| 2006/0011728 A1 | 1/2006 | Frantz et al. | |
| 2006/0023945 A1 | 2/2006 | King et al. | |
| 2006/0036462 A1 | 2/2006 | King et al. | |
| 2006/0041484 A1 | 2/2006 | King et al. | |
| 2006/0041538 A1 | 2/2006 | King et al. | |
| 2006/0041590 A1 | 2/2006 | King et al. | |
| 2006/0041605 A1 | 2/2006 | King et al. | |
| 2006/0045374 A1 | 3/2006 | Kim et al. | |
| 2006/0048046 A1 | 3/2006 | Joshi et al. | |
| 2006/0053097 A1 | 3/2006 | King et al. | |
| 2006/0069616 A1 | 3/2006 | Bau | |
| 2006/0075327 A1 | 4/2006 | Sriver | |
| 2006/0081714 A1 | 4/2006 | King et al. | |
| 2006/0085477 A1 | 4/2006 | Phillips et al. | |
| 2006/0098900 A1 | 5/2006 | King et al. | |
| 2006/0101285 A1 | 5/2006 | Chen et al. | |
| 2006/0103893 A1* | 5/2006 | Azimi et al. | 358/474 |
| 2006/0104515 A1 | 5/2006 | King et al. | |
| 2006/0119900 A1 | 6/2006 | King et al. | |
| 2006/0122983 A1 | 6/2006 | King et al. | |
| 2006/0136629 A1 | 6/2006 | King et al. | |
| 2006/0138219 A1 | 6/2006 | Brzezniak et al. | |
| 2006/0146169 A1 | 7/2006 | Segman | |
| 2006/0173859 A1 | 8/2006 | Kim et al. | |
| 2006/0195695 A1 | 8/2006 | Keys | |
| 2006/0200780 A1 | 9/2006 | Iwema et al. | |
| 2006/0224895 A1 | 10/2006 | Mayer | |
| 2006/0229940 A1 | 10/2006 | Grossman | |
| 2006/0239579 A1 | 10/2006 | Ritter | |
| 2006/0256371 A1 | 11/2006 | King et al. | |
| 2006/0259783 A1 | 11/2006 | Work et al. | |
| 2006/0266839 A1* | 11/2006 | Yavid et al. | 235/462.45 |
| 2006/0283952 A1* | 12/2006 | Wang | 235/462.01 |
| 2007/0009245 A1 | 1/2007 | Ito | |
| 2007/0050712 A1 | 3/2007 | Hull et al. | |
| 2007/0061146 A1 | 3/2007 | Jaramillo et al. | |
| 2007/0173266 A1 | 7/2007 | Barnes, Jr. | |
| 2007/0194119 A1* | 8/2007 | Vinogradov et al. | 235/454 |
| 2007/0208561 A1 | 9/2007 | Choi et al. | |
| 2007/0208732 A1 | 9/2007 | Flowers et al. | |
| 2007/0219940 A1 | 9/2007 | Mueller et al. | |
| 2007/0228306 A1* | 10/2007 | Gannon et al. | 250/555 |
| 2007/0233806 A1 | 10/2007 | Asadi | |
| 2007/0238076 A1 | 10/2007 | Burstein et al. | |
| 2007/0249406 A1 | 10/2007 | Andreasson | |
| 2007/0279711 A1 | 12/2007 | King et al. | |
| 2007/0300142 A1 | 12/2007 | King et al. | |
| 2008/0023550 A1* | 1/2008 | Yu et al. | 235/462.32 |
| 2008/0046417 A1 | 2/2008 | Jeffery et al. | |
| 2008/0071775 A1 | 3/2008 | Gross | |
| 2008/0072134 A1 | 3/2008 | Balakrishnan et al. | |
| 2008/0082903 A1 | 4/2008 | McCurdy et al. | |
| 2008/0091954 A1 | 4/2008 | Morris et al. | |
| 2008/0093460 A1 | 4/2008 | Frantz et al. | |
| 2008/0126415 A1 | 5/2008 | Chaudhury et al. | |
| 2008/0137971 A1 | 6/2008 | King et al. | |
| 2008/0141117 A1 | 6/2008 | King et al. | |
| 2008/0170674 A1 | 7/2008 | Ozden et al. | |
| 2008/0172365 A1 | 7/2008 | Ozden et al. | |
| 2008/0177825 A1 | 7/2008 | Dubinko et al. | |
| 2008/0195664 A1 | 8/2008 | Maharajh et al. | |
| 2008/0222166 A1 | 9/2008 | Hultgren et al. | |
| 2008/0235093 A1 | 9/2008 | Uland | |
| 2008/0313172 A1 | 12/2008 | King et al. | |
| 2009/0012806 A1 | 1/2009 | Ricordi et al. | |
| 2009/0018990 A1 | 1/2009 | Moraleda | |
| 2009/0077658 A1 | 3/2009 | King et al. | |
| 2009/0247219 A1 | 10/2009 | Lin et al. | |
| 2010/0092095 A1 | 4/2010 | King et al. | |
| 2010/0121848 A1 | 5/2010 | Yaroslavskiy et al. | |
| 2010/0177970 A1 | 7/2010 | King et al. | |
| 2010/0182631 A1 | 7/2010 | King et al. | |
| 2010/0183246 A1 | 7/2010 | King et al. | |
| 2010/0185538 A1 | 7/2010 | King et al. | |
| 2010/0185620 A1 | 7/2010 | Schiller | |
| 2010/0278453 A1 | 11/2010 | King | |
| 2010/0318797 A1 | 12/2010 | King et al. | |
| 2011/0019020 A1 | 1/2011 | King et al. | |
| 2011/0019919 A1 | 1/2011 | King et al. | |
| 2011/0022940 A1 | 1/2011 | King et al. | |
| 2011/0025842 A1 | 2/2011 | King et al. | |
| 2011/0026838 A1 | 2/2011 | King et al. | |
| 2011/0029443 A1 | 2/2011 | King et al. | |
| 2011/0029504 A1 | 2/2011 | King et al. | |
| 2011/0033080 A1 | 2/2011 | King et al. | |
| 2011/0035289 A1 | 2/2011 | King et al. | |
| 2011/0035656 A1 | 2/2011 | King et al. | |
| 2011/0035662 A1 | 2/2011 | King et al. | |
| 2011/0043652 A1 | 2/2011 | King et al. | |
| 2011/0044547 A1 | 2/2011 | King et al. | |
| 2011/0072012 A1 | 3/2011 | Ah-Pine et al. | |
| 2011/0072395 A1 | 3/2011 | King et al. | |
| 2011/0075228 A1 | 3/2011 | King et al. | |
| 2011/0078585 A1 | 3/2011 | King et al. | |
| 2011/0085211 A1 | 4/2011 | King et al. | |
| 2011/0096174 A1 | 4/2011 | King et al. | |
| 2011/0209191 A1 | 8/2011 | Shah | |
| 2011/0295842 A1 | 12/2011 | King et al. | |
| 2011/0299125 A1 | 12/2011 | King et al. | |

FOREIGN PATENT DOCUMENTS

| | | |
|---|---|---|
| EP | 0596247 | 5/1994 |
| EP | 0697793 | 2/1996 |
| EP | 0887753 | 12/1998 |
| EP | 1054335 | 11/2000 |
| EP | 1087305 | 3/2001 |
| EP | 1318659 | 6/2003 |
| EP | 1398711 | 3/2004 |
| GB | 2 366 033 | 2/2002 |
| JP | 03-260768 | 11/1991 |
| JP | 10-133847 | 5/1998 |
| JP | 10200804 A * | 7/1998 |
| JP | H11-213011 | 8/1999 |
| JP | 2001-345710 | 12/2001 |
| JP | 2003-216631 | 7/2003 |
| JP | 2004-500635 | 1/2004 |
| JP | 2004-050722 | 2/2004 |
| KR | 10-2000-0054268 | 9/2000 |
| KR | 10-2000-0054339 | 9/2000 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | 98/03923 | 1/1998 |
| WO | 00/41128 | 7/2000 |
| WO | 00/56055 | 9/2000 |
| WO | 00/67091 | 11/2000 |
| WO | 01/03017 | 1/2001 |

(56) References Cited

FOREIGN PATENT DOCUMENTS

| | | |
|---|---|---|
| WO | 01/24051 | 4/2001 |
| WO | 01/33553 | 5/2001 |
| WO | 02/11446 | 2/2002 |
| WO | 02/061730 | 8/2002 |
| WO | 02/091233 | 11/2002 |
| WO | 2004/084109 | 9/2004 |
| WO | 2005/071665 | 8/2005 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/029259 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/002074 | 1/2008 |
| WO | 2008/014255 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

Brin et al., "The Anatomy of a Large-Scale Hypertextual Web Search Engine," Computer Networks and ISDN Systems, Vo. 30, Issue 1-7, Apr. 1, 1998, pp. 1-22.
Bahl, et al., "Font Independent Character Recognition by Cryptanalysis," IBM Technical Disclosure Bulletin, vol. 24, No. 3, pp. 1588-1589 (Aug. 1, 1981).
Ramesh, R.S. et al., "An Automated Approach to Solve Simple Substitution Ciphers," Cryptologia, vol. 17. No. 2, pp. 202-218 (1993).
Nagy et al., "Decoding Substitution Ciphers by Means of Word Matching with Application to OCR," IEEE Transactions on Pattern Analysis and Machine Intelligence, vol. 30, No. 5, pp. 710-715 (Sep. 1, 1987).
Wood et al., "Implementing a faster string search algorithm in Ada," CM Sigada Ada Letters, vol. 8, No. 3, pp. 87-97 (Apr. 1, 1988).
Garain et al., "Compression of Scan-Digitized Indian Language Printed Text: A Soft Pattern Matching Technique," Proceedings of the 2003 ACM Symposium on Document Engineering, pp. 185-192 (Jan. 1, 2003).
King et al., U.S. Appl. No. 13/186,908, filed Jul. 20, 2011, all pages.
King et al., U.S. Appl. No. 13/253,632, filed Oct. 5, 2011, all pages.
King et al., U.S. Appl. No. 13/614,770, filed Sep. 13, 2013, 102 pages.
King et al., U.S. Appl. No. 13/614,473, filed Sep. 13, 2013, 120 pages.
King et al., U.S. Appl. No. 13/615,517, filed Sep. 13, 2013, 114 pages.
Bagley, et al., Editing Images of Text, Communications of the ACM, 37(12):63-72 (Dec. 1994).
Agilent ADNK-2133 Optical Mouse Designer's Kit: Product Overview., Agilent Technologies (2004).
AirClic, "With AirClic, there's a product to meet your needs today. And tomorrow.," AirClic, 2005, http://www.airclic.com/products.asp, accessed Oct. 3, 2005.
Arai et al., "PaperLink: A Technique for Hyperlinking from Real Paper to Electronic Content," Proceedings of the ACM Conference on Human Factors in Computing Systems (CHI 97), Addison-Wesley, pp. 327-334 (Apr. 1997).
Aust "Augmenting Paper Documents with Digital Information in a Mobile Environment," MS Thesis, University of Dortmund, Department of Computer Graphics (Sep. 3, 1996).
Babylon Ltd., "Babylon—Online Dictionary and Translation Software", Jan. 4, 2008.
Bai et al., "An Approach to Extracting the Target Text Line from a Document Image Captured by a Pen Scanner," Proceedings of the Seventh International Conference on Document Analysis and Recognition (ICDAR 2003), Aug. 6, 2003, pp. 76-80.
Bell et al., "Modeling for Text Compression," ACM Computing Surveys, 21(4):557-591 (Dec. 1989).
Bentley et al., "Fast Algorithms for Sorting and Searching Strings," Proceedings of the 8th ACM-SIAM Symposium on Discrete Algorithms, CM Press, 360-369 (1997).
Black et al.,"The Festival Speech Synthesis System, Edition 1.4, for Festival Version 1.4.0", http://www.cstr.ed.ac.uk/projects/festival/manual/ (Jun. 17, 1999).
Brickman et al., "Word Autocorrelation Redundancy Match (WARM) Technology," IBM J. Res. Develop., 26(6):681-686 (Nov. 1982).
Burle Technical Memorandum 100. "Fiber Optics: Theory and Applications," http://www.burle.com/cgi-bin/byteserver.pl/pdf/100r.pdf ( 2000).
C Technologies AB. "CPEN User's Guide." (Jan. 2001).
C Technologies AB. "User's Guide for C-Pen 10." (Aug. 2001).
Capobianco, Robert A., "Design Considerations for: Optical Coupling of Flashlamps and Fiber Optics," 12 pages, PerkinElmer (1998-2003).
Casey et al., "An Autonomous Reading Machine," IEEE Transactions on Computers, V. C-17, No. 5, pp. 492-503 (May 1968).
Casio Computer Co. Ltd, "Alliance Agreement on Development and Mass Production of Fingerprint Scanner for Mobile Devices," Casio Computer Co. Ltd (Feb. 25, 2003).
Cenker, Christian, "Wavelet Packets and Optimization in Pattern Recognition," Proceedings of the 21st International Workshop of the AAPR, Hallstatt, Austria, May 1997, pp. 49-58.
Clancy, Heather, "Cell Phones Get New Job: Portable Scanning." CNet News.com (Feb. 12, 2005).
Computer Hope, "Creating a link without an underline in HTML:," as evidenced by Internet Archive Wayback Machine: http://web.archive.org/web/20010329222623/http://www.computerhope.com/iss-ues/ch000074.htm, Mar. 29, 2001.
Curtain, D.P., "Image Sensors—Capturing the Photograph," 2006, available at http://www.shortcourses.com/how/sensors/sensors.htm (last visited Sep. 4, 2006).
Cybertracker, "Homepage," http://www.cybertracker.co.za/, accessed Oct. 3, 2005.
Digital Convergence Corp., "CueCat Barcode Scanner," www.cuecat.com, accessed Oct. 3, 2005.
Docuport Inc., "DocuPen Operating Manual." Montreal, Quebec (2004).
Doermann et al., "The Detection of Duplicates in Document Image Databases," Technical Report. LAMP-TR-005/CAR-TR-850/CS-TR-3739, University of Maryland College Park (Feb. 1997).

(56) References Cited

OTHER PUBLICATIONS

Doermann et al., "The Development of a General Framework for Intelligent Document Image Retrieval," Series in Machine Perception and Artificial Intelligence, vol. 29: Document Analysis Systems II., Washington DC: World Scientific Press, 28 pp. (1997).
Doermann, David, "The Indexing and Retrieval of Document Images: A Survey," Technical Report. LAMP-TR-0013/CAR-TR-878/CS-TR-3876. University of Maryland College Park (Feb. 1998).
Duong et al., "Extraction of Text Areas in Printed Document Images," Proceedings of the 2001 ACM Symposium on Document Engineering, Nov. 10, 2001, New York, NY, ACM Press, pp. 157-164.
EBooks, eBooks Quickstart Guide, nl-487 (2001).
Erol et al., "Linking Multimedia Presentations with their Symbolic Source Documents: Algorithm and Applications," Proceedings of the Eleventh ACM International Conference on Multimedia, Nov. 2-8, 2003, Berkeley, CA, USA, pp. 498-507.
Fall et al., "Automated Categorization in the International Patent Classification," ACM SIGIR Forum, 37(1):10-25 (Spring 2003).
Fehrenbacher, Katie, "Quick Frucall Could Save You Pennies (or $$$)", GigaOM, http://gigaom.com/2006/07/10/frucall (Jul. 10, 2006).
Feldman, Susan, "The Answer Machine," Searcher: The Magazine for Database Professionals, 8(1):58 (Jan. 2000).
Fitzgibbon et al., "'Memories for life' Managing information over a human lifetime," UK Computing Research Committee's Grand Challenges in Computing Workshop (May 22, 2003).
Ghaly et al., "Sams Teach Yourself EJB in 21 Days," Sams Publishing, pp. 1-2, 123 and 125 (2002-2003).
Ghani et al., "Mining the Web to Create Minority Language Corpora," Proceedings of the 10th International Conference on Information and Knowledge Management (CIKM) Nov. 5-10, 2001, pp. 279-286.
Globalink, Inc. "Globalink, Inc. announces Talk to Me, an interactive language learning software program," The Free Library by Farlex, Jan. 21, 1997 (retrieved from internet Jan. 4, 2008).
Google Inc., "Google Search Appliance—Intranets." (2004).
Google Inc., "Simplicity and Enterprise Search." (2003).
Graham et al., "The Video Paper Multimedia Playback System," Proceedings of the Eleventh ACM International Conference on Multimedia, Nov. 2-8, 2003, Berkeley, CA, USA, pp. 94-95.
Grossman et al., "Token Identification" Slideshow (2002).
Guimbretiere, Francois, "Paper Augmented Digital Documents," Proceedings of 16th Annual ACM Symposium on User Interface Software and Technology, New York, NY, ACM Press, pp. 51-60 (2003).
Hansen, Jesse, "A Matlab Project in Optical Character Recognition (OCR)," DSP Lab, University of Rhode Island, 6 pp (May 15, 2002).
Heiner et al., "Linking and Messaging from Real Paper in the Paper PDA," ACM Symposium on User Interface Software and Technology, New York, NY: ACM Press, pp. 179-186 (1999).
Henseler, Dr. Hans, "ZyIMAGE Security Whitepaper Functional and Document Level Security in ZyIMAGE," Zylab Technologies B.V., Apr. 9, 2004.
Hewlett-Packard Company, "HP Capshare 920 Portable E-Copier an Information Appliance User Guide, First Edition," 42 pp. (1999).
Hjaltason et al., "Distance Browsing in Spatial Databases," ACM Transactions on Database Systems, 24(2):265-318 (Jun. 1999).
Hong et al., "Degraded Text Recognition Using Word Collocation and Visual Inter-Word Constraints," Fourth ACL Conference on Applied Natural Language Processing, Stuttgart, Germany, pp. 186-187 (1994).
Hopkins et al., "A Semi-Imaging Light Pipe for Collecting Weakly Scattered Light," HPL-98-116Hewlett Packard Company (Jun. 1998).
Hu et al., "Comparison and Classification of Documents Based on Layout Similarity," Information Retrieval, vol. 2, Issues 2-3, May 2000, pp. 227-243.
Hull et al., "Simultaneous Highlighting of Paper and Electronic Documents," Proceedings of the 15th International Conference on Pattern Recognition (ICPR '00), Sep. 3, 2000, vol. 4, IEEE, Barcelona, 401-404 (2000).
Hull et al., "Document Analysis Techniques for the Infinite Memory Multifunction Machine," Proceedings of the $10^{th}$ International Workshop in Database and Expert Systems Applications, Florence, Italy, Sep. 1-3, 1999, pp. 561-565.
Inglis et al., "Compression-Based Template Matching," Data Compression Conference, Mar. 29-31, 1994, Snowbird, UT, pp. 106-115.
IPValue Management, Inc.., "Technology Licensing Opportunity: Xerox Mobile Camera Document Imaging," Slideshow (Mar. 1, 2004).
IRIS, Inc "IRIS Business Card Reader II," Brochure. (2000).
IRIS, Inc., "IRIS Pen Executive," Brochure (2000).
ISRI Staff, "OCR Accuracy Produced by the Current DOE Document Conversion System," Technical report Jun. 2002, Information Science Research Institute at the University of Nevada, Las Vegas (May 2002).
Jacobson et al., "The last book," IBM Systems Journal, 36(3):457-463 (1997).
Jainschigg et al., "M-Commerce Alternatives," Communications Convergence.com http://www.cconvergence.com/shared/article/showArticle.jhtml?articleId=8701069 (May 7, 2001).
Janesick, James, "Dueling Detectors," Spie's OE Magazine, 30-33 (Feb. 2002).
Jenny, Reinhard, "Fundamentals of Fiber Optics an Introduction for Beginners," Volpi Manufacturing USA Co., Inc. Auburn, NY (Apr. 26, 2000).
Jones, R., "Physics and the Visual Arts Notes on Lesson 4", Sep. 12, 2004, University of South Carolina, available at http://www.physics.sc.edu/~rjones/phys153/lec04.html.
Kahan et al., "Annotea: An Open RDF Infrastructure for Shared Web Annotations," Proceedings of the 10th International World Wide Web Conference, Hong Kong, pp. 623-632 (May 1-5, 2001).
Kasabach et al., "Digital Ink: A Familiar Idea with Technological Might!" CHI 1998 Conference, Apr. 18-23, 1998, New York, NY: ACM Press, 175-176 (1997).
Keytronic, "F-SCAN-S001US Stand Alone Fingerprint Scanner," http://www.keytronic.com/home/shop/Productlist.asp?CATID=62&SubCATID=1 accessed Oct. 4, 2005.
Khoubyari, Siamak, "The Application of Word Image Matching in Text Recognition," MS Thesis, State University of New York at Buffalo (Jun. 1992).
Kia, Omid E., "Document Image Compression and Analysis," PhD Thesis, University of Maryland at College Park, (1997).
Kia et al., "Integrated Segmentation and Clustering for Enhanced Compression of Document Images," International Conference on Document Analysis and Recognition, Ulm, Germany, 1:406-11(Aug. 18-20, 1997).
Kia et al., "Symbolic Compression and Processing of Document Images", Technical Report: LAMP-TR-004/CFAR-TR-849/CS-TR-3734., University of Maryland, College Park. (Jan. 1997).
Kopec, Gary E., "Multilevel Character Templates for Document Image Decoding," IS&T/SPIE 1997 International Symposium on Electronic Imaging: Science & Technology, San Jose, CA, Feb. 8-14, 1997.
Kopec et al., "N-Gram Language Models for Document Image Decoding," IS&T/SPIE Proceedings, 4670:191-202, Jan. 2002.
Kukich, Karen, "Techniques for Automatically Correcting Words in Text," ACM Computing Surveys, 24(4);377-439 (Dec. 1992).
Lee, Dar-Shyang, "Substitution Deciphering Based on HMMs with Applications to Compressed Document Processing," IEEE Transactions on Pattern Analysis and Machine Intelligence, 24(12):1661-1666 (Dec. 2002).
Lee et al., "Detecting duplicates among symbolically compressed images in a large document database," Pattern Recognition Letters, 22:545-550 (2001).
Lee et al., "Duplicate Detection for Symbolically Compressed Documents," Fifth International Conference on Document Analysis and Recognition (ICDAR), pp. 305-308 (Sep. 20-22, 1999).
Lee et al., "Ultrahigh-resolution plastic graded-index fused image plates," Optics Letters, 25(10):719-721 (May 15, 2000).

(56) References Cited

OTHER PUBLICATIONS

Lee et al., "Voice Response Systems," ACM Computing Surveys 15(4):351-374 (Dec. 1983).
Lesher et al., "Effects of Ngram Order and Training Text Size on Word Prediction," Proceedings of the RESNA '99 Annual Conference (1999).
Lieberman, Henry, "Out of Many, One: Reliable Results from Unreliable Recognition," ACM Conference on Human Factors in Computing Systems (CHI 2002); 728-729 (Apr. 20-25, 2002).
Liu et al., "Adaptive Post-Processing of OCR Text Via Knowledge Acquisition," Proceedings of the ACM 1991 Conference on Computer Science, New York, NY: ACM Press, 558-569 (1991).
Ljungstrand et al., "WebStickers: Using Physical Tokens to Access, Manage and Share Bookmarks to the Web," Proceedings of Designing Augmented Reality Environments 2000, Elsinore, Denmark, pp. 23-31 (Apr. 12-14, 2000).
LTI Computer Vision Library, "LTI Image Processing Library Developers Guide," Version 29.10.2003, Aachen, Germany, (2002).
Macholl et al., "Translation Pen Lacks Practicality," BYTE.com (Jan. 1998).
Manolescu, Dragos-Anton, "Feature Extraction—A Pattern for Information Retrieval," Proceedings of the 5th Pattern Languages of Programming Monticello, Illinois, (Aug. 1998).
McNamee et al., "Haircut: A System for Multilingual Text Retrieval in Java," Journal of Computing Sciences in Small Colleges, 17(2):8-22 (Feb. 2002).
Miller et al., "How Children Learn Words," Scientific American, 257(3):94-99 (Sep. 1987).
Mind Like Water, Inc., "Collection Creator Version 2.0.1 Now Available!," www.collectioncreator.com, 2004, accessed Oct. 2, 2005.
Muddu, Prashant, "A Study of Image Transmission Through a Fiber-Optic Conduit and its Enhancement Using Digital Image Processing Techniques," M.S. Thesis, Florida State College of Engineering (Nov. 18, 2003).
Munich et al., "Visual Input for Pen-Based Computers," Proceedings of the International Conference on Pattern Recognition (ICPR '96) vol. III, pp. 33-37, IEEE CS Press (Aug. 25-29, 1996).
Murdoch et al., "Mapping Physical Artifacts to their Web Counterparts: A Case Study with Products Catalogs," MHCI-2004 Workshop on Mobile and Ubiquitous Information Access, Strathclyde, UK (2004).
Nabeshima et al., "MEMO-PEN: A New Input Device," CHI '95 Proceedings Short Papers, ACM Press, 256-257 (May 7-11, 1995).
Nagy et al., "A Prototype Document Image Analysis System for Technical Journals," IEEE Computer, 10-22 (Jul. 1992).
Nautilus Hyosung, "New Software for Automated Teller Machines," http://www.nautilus.hyosung.com/product_service/software_software05.html, 2002, accessed Oct. 4, 2005.
Neomedia Technologies, "Paperclick for Cellphones", brochure (2004).
Neomedia Technologies, "Paperclick Linking Services ", brochure (2004).
Neomedia Technologies, "For Wireless Communication Providers", brochure (2004).
Pellissippi Library, "Skills Guide #4, Setting up your netlibrary Account," Knoxville, TN, Sep. 21, 2001.
Neville, Sean "Project Atom, Amazon, Mobile Web Services, and Fireflies at Rest," Artima Weblogs, http://www.artima.com/weblogs/viewpost.jsp?thread=18731 (Oct. 24, 2003).
Newman et al. "Camworks: A Video-Based Tool for Efficient Capture from Paper Source Documents," Proceedings of the 1999 IEEE International Conference on Multimedia Computing and Systems, vol. 2, pp. 647-653 (1999).
Newman, William, "Document DNA: Camera Image Processing," (Sep. 2003).
Newman et al., "A Desk Supporting Computer-based Interaction with Paper Documents," Proceedings of ACM CHI'92 Conference on Human Factors in Computing Systems, 587-592 (May 3-7, 1992).
NSG America Inc.., "SELFOC Lens Arrays for Line Scanning Applications," Intelligent Opto Sensor Designer's Notebook, No. 2, Revision B, (2002).
O'Gorman, "Image and Document Processing Techniques for the RightPages Electronic Library System," IEEE 11th International Conference on Pattern Recognition, Aug. 30-Sep. 3, 1992, The Hague, The Netherlands, vol. II, pp. 260-263.
Onclick Corporation, "VIA Mouse VIA-251," brochure (2003).
Pal et al., "Multi-Oriented Text Lines Detection and Their Skew Estimation," Indian Conference on Computer Vision, Graphics, and Image Processing, Ahmedabad, India (Dec. 16-18, 2002).
Peacocks MD&B, "Peacocks MD&B, Releases Latest hands and Eyes Free Voice Recognition Barcode Scanner," http://www.peacocks.com.au/store/page.pl?id=457 accessed Oct. 4, 2005.
Peterson, James L., "Computer Programs for Detecting and Correcting Spelling Errors," Communications of the ACM, 23(12):676-687 (Dec. 1980).
Planon Systems Solutions Inc., "Docupen 700," www.docupen.com, accessed Oct. 3, 2005.
Podio, Fernando L., "Biometrics—Technologies for Highly Secure Personal Authentication," ITL Bulletin, National Institute of Standards and Technology, pp. 1-7, http://whitepapers.zdnet.com/search.aspx?compid=3968 (May 2001).
Abera Technologies Inc., "Abera Introduces Truly Portable & Wireless Color Scanners: Capture Images Anywhere in the World without Connection to PC," PR Newswire (Oct. 9, 2000).
Precise Biometrics Inc., "Precise 200 MC," http://www.precisebiometrics.com/data/content/DOCUMENTS/20059269195532 00%20MC.pdf , accessed Oct. 4, 2005.
Price et al., "Linking by Inking: Trailblazing in a Paper-like Hypertext," Proceedings of Hypertext '98, Pittsburgh, PA: ACM Press, pp. 30-39 (1998).
PSION Teklogix Inc., "Workabout Pro," http://www.psionteklogix.com/public.aspx?s=uk&p=Products&pCat=128&pID=1058, accessed Oct. 3, 2005.
Rao et al., "Protofoil: Storing and Finding the Information Worker's Paper Documents in an Electronic File Cabinet," Proceedings of the ACM SIGCHI Conference on Human Factors in Computing Systems, ACM Press, 180-185, 477 (Apr. 24-28, 1994).
Roberts et al., "1D and 2D laser line scan generation using a fibre optic resonant scanner," EOS/SPIE Symposium on Applied Photonics (ISAP 2000), Glasgow, SPIE Proc. 4075:62-73 (May 21-25, 2000).
Rus et al., "Multi-media RISSC Informatics: Retrieving Information with Simple Structural Components," Proceedings of the Second International Conference on Information and Knowledge Management, New York, NY, pp. 283-294 (1993).
Samet, Hanan, "Data Structures for Quadtree Approximation and Compression," Communications of the ACM, 28(9):973-993 (Sep. 1985).
Sanderson et al., "The Impact on Retrieval Effectiveness of Skewed Frequency Distributions," ACM Transactions on Information Systems, 17(4):440-465 (Oct. 1999).
Sarre et al. "HyperTex—a system for the automatic generation of Hypertext Textbooks from Linear Texts," Database and Expert Systems Applications, Proceedings of the International Conference, Abstract (1990).
Schilit et al., "Beyond Paper: Supporting Active Reading with Free Form Digital Ink Annotations," Proceedings of CHI 98, ACM Press, pp. 249-256 (1998).
Schott North America, Inc., "Clad Rod/ Image Conduit," Version 10/01, (Nov. 2004).
Schuuring, Daniel, "Best practices in e-discovery and e-disclosure White Paper," ZyLAB Information Access Solutions (Feb. 17, 2006).
Selberg et al., "On the Instability of Web Search Engines," In the Proceedings of Recherche d'Information Assistée par Ordinateur (RIAO) '00, Paris, pp. 223-235(Apr. 2000).
Sheridon et al., "The Gyricon—A Twisting Ball Display," Proceedings of the Society for Information Display, vol. 18/3 & 4, Third and Fourth Quarter, pp. 289-293 (May 1977).
Smithwick et al., "54.3: Modeling and Control of the Resonant Fiber Scanner for Laser Scanning Display or Acquisition," SID Symposium Digest of Technical Papers, 34:1, pp. 1455-1457 (May 2003).

(56) References Cited

OTHER PUBLICATIONS

Solutions Software Corp., "Environmental Code of Federal Regulations (CFRs) including TSCA and SARA," Solutions Software Corp., Enterprise, FL Abstract (Apr. 1994).
Sonka et al, Image Processing, Analysis, and Machine Vision: (Second Edition). International Thomson Publishing, Contents, Preface, and Index (1998).
Sony Electronics Inc., "Sony Puppy Fingerprint Identity Products," http://bssc.sel.sony.com/Professional/puppy/ (2002).
Spitz, A. Lawrence, "Progress in Document Reconstruction," 16th International Conference on Pattern Recognition (ICPR '02), pp. 464-467 (2002).
Spitz, A. Lawrence, "Shape-based Word Recognition," International Journal on Document Analysis and Recognition, pp. 178-190 (Oct. 20, 1998).
Srihari et al., "Integrating Diverse Knowledge Sources in Text Recognition," ACM Transactions in Office Information Systems, 1(1):66-87 (Jan. 1983).
Stevens et al., "Automatic Processing of Document Annotations," British Machine Vision Conference 1998, pp. 438-448, available at http://www.bmva.org/bmvc/1998/pdf/p062.pdf (1998).
Stifelman, Lisa J., "Augmenting Real-World Objects: A Paper-Based Audio Notebook," Proceedings of CHI '96, 199-200 (1996).
Story et al., "The RightPages Image-Based Electronic Library for Alerting and Browsing," IEEE, Computer, pp. 17-26 (Sep. 1992).
Su et al., "Optical Scanners Realized by Surface-Micromachined Vertical Torsion Mirror," IEEE Photonics Technology Letters, 11(5):587-589 (May 1999).
Syscan Imaging, "Travelscan 464," http://www.syscaninc.com/prod_ts_464.html, 2 pp, accessed Oct. 3, 2005.
Taghva et al., "Results of Applying Probabilistic IR to OCR Text," Proceedings of the 17th Annual International ACM-SIGIR Conference on Research and Development in Information Retrieval, pp. 202-211 (1994).
Tan et al., "Text Retrieval from Document Images Based on N-Gram Algorithm," PRICAI Workshop on Text and Web Mining, pp. 1-12 (2000).
Trusted Reviews, "Digital Pen Roundup," http://www.trustedreviews.com/article.aspx?art=183 (Jan. 24, 2004).
TYI Systems Ltd., "Bellus iPen," http://www.bellus.com.tw/pen_scanner.htm accessed Oct. 3, 2005.
U.S. Precision Lens, "The Handbook of Plastic Optics", 1983, 2nd Edition.
Van Eijkelenborg, Martijn A., "Imaging with Microstructured Polymer Fibre," Optics Express, 12(2):342-346 (Jan. 26, 2004).
Vervoort, Marco, "Emile 4.1.6 User Guide," University of Amsterdam (Jun. 12, 2003).
Vocollect, "Vocollect Voice for Handhelds," http://www.vocollect.com/offerings/voice_handhelds.php accessed Oct. 3, 2005.
Vossler et al., "The Use of Context for Correcting Garbled English Text," Cornell Aeronautical Laboratory, Proceedings of the 1964 19th ACM National Conference, ACM Press, pp. D2.4-1 to D2.4-13(1964).
Wang et al., "Segmentation of Merged Characters by Neural Network and Shortest-Path," Proceedings of the 1993 ACM/SIGAPP Symposium on Applied Computing: States of the Art and Practice, ACM Press, 762-769 (1993).
Wang et al., "Micromachined Optical Waveguide Cantilever as a Resonant Optical Scanner," Sensors and Actuators A (Physical), 102(1-2):165-175 (2002).
Wang et al., "A Study on the Document Zone Content Classification Problem," Proceedings of the 5th International Workshop on Document Analysis Systems, pp. 212-223 (2002).
Whittaker et al., "Filochat: Handwritten Notes Provide Access to Recorded Conversations," Human Factors in Computing Systems, CHI '94 Conference Proceedings, pp. 271-277 (Apr. 24-28, 1994).
Whittaker, Steve, "Using Cognitive Artifacts in the Design of Multimodal Interfaces," AT&T Labs Research (May 24, 2004).
Wilcox et al., "Dynomite: A Dynamically Organized Ink and Audio Notebook," Conference on Human Factors in Computing Systems, pp. 186-193 (1997).
Wizcom Technologies, "QuickLink-Pen Elite," http://www.wizcomtech.com/Wizcom/products/product_info.asp?fid=1-1, accessed Oct. 3, 2005 (2004).
Wizcom Techonologies, "SuperPen Professional Product Page," http://www.wizcomtech.com/Wizcom/proucts/product_info.asp?fid=88&cp=1, accessed Oct. 3, 2005 (2004).
Centre for Speech Technology Research, "The Festival Speech Synthesis System," www.cstr.ed.ac.uk/projects/festival, accessed Jan. 4, 2008.
Ficstar Software Inc., "Welcome to Ficstar Software," www.ficstar.com accessed Oct. 4, 2005.
Lingolex, "Automatic Computer Translation" http://www.lingolex.com/translationsoftware.htm (downloaded on Aug. 6, 2000).
Xerox, "Patented Technology Could Turn Camera Phone Into Portable Scanner," Press Release Nov. 15, 2004.
Non-Final Office Action for U.S. Appl. No. 11/004,637 dated Dec. 21, 2007.
Final Office Action for U.S. Appl. No. 11/004,637 dated Oct. 2, 2008.
Non-Final Office Action for U.S. Appl. No. 11/004,637 dated Apr. 2, 2009.
Notice of Allowance for U.S. Appl. No. 11/004,637 dated Dec. 11, 2009.
Non-Final Office Action for U.S. Appl. No. 11/096,704 dated Sep. 10, 2008.
Notice of Allowance for U.S. Appl. No. 11/096,704 dated Mar. 11, 2009.
Notice of Allowance for U.S. Appl. No. 11/096,704 dated Jun. 5, 2009.
Non-Final Office Action for U.S. Appl. No. 11/097,089 dated Aug. 13, 2008.
Final Office Action for U.S. Appl. No. 11/097,089 dated Mar. 17, 2009.
Non-Final Office Action for U.S. Appl. No. 11/097,089 dated Dec. 23, 2009.
Final Office Action for U.S. Appl. No. 11/097,089 dated Sep. 23, 2010.
Non-Final Office Action for U.S. Appl. No. 11/097,089 dated Apr. 7, 2011.
Non-Final Office Action for U.S. Appl. No. 11/097,093 dated Jul. 10, 2007.
Non-Final Office Action for U.S. Appl. No. 11/097,103 dated Jun. 25, 2007.
Non-Final Office Action for U.S. Appl. No. 11/097,103 dated Jan. 28, 2008.
Non-Final Office Action for U.S. Appl. No. 11/097,103 dated Dec. 31, 2008.
Notice of Allowance for U.S. Appl. No. 11/097,103 dated May 14, 2009.
Non-Final Office Action for U.S. Appl. No. 11/097,828 dated May 22, 2008.
Final Office Action for U.S. Appl. No. 11/097,828 dated Feb. 4, 2009.
Notice of Allowance for U.S. Appl. No. 11/097,828 dated Feb. 5, 2010.
Non-Final Office Action for U.S. Appl. No. 11/097,833 dated Jun. 25, 2008.
Final Office Action for U.S. Appl. No. 11/097,833 dated Jul. 7, 2009.
Notice of Allowance for U.S. Appl. No. 11/097,833 dated Jan. 10, 2011.
Non-Final Office Action for U.S. Appl. No. 11/097,835 dated Oct. 9, 2007.
Final Office Action for U.S. Appl. No. 11/097,835 dated Jun. 23, 2008.
Non-Final Office Action for U.S. Appl. No. 11/097,835 dated Feb. 19, 2009.
Final Office Action for U.S. Appl. No. 11/097,835 dated Dec. 29, 2009.
Notice of Allowance for U.S. Appl. No. 11/097,835 dated Sep. 1, 2010.
Non-Final Office Action for U.S. Appl. No. 11/097,836 dated May 13, 2008.

(56) References Cited

OTHER PUBLICATIONS

Final Office Action for U.S. Appl. No. 11/097,836 dated Jan. 6, 2009.
Non-Final Office Action for U.S. Appl. No. 11/097,836 dated Jul. 30, 2009.
Final Office Action for U.S. Appl. No. 11/097,836 dated May 13, 2010.
Non-Final Office Action for U.S. Appl. No. 11/097,961 dated Sep. 15, 2008.
Non-Final Office Action for U.S. Appl. No. 11/097,961 dated Mar. 5, 2009.
Final Office Action for U.S. Appl. No. 11/097,961 dated Dec. 9, 2009.
Non-Final Office Action for U.S. Appl. No. 11/097,961 dated Jul. 9, 2010.
Non-Final Office Action for U.S. Appl. No. 11/097,981 dated Jan. 16, 2009.
Notice of Allowance for U.S. Appl. No. 11/097,981 dated Jul. 31, 2009.
Non- Final Office Action for U.S. Appl. No. 11/098,014 dated Jun. 18, 2008.
Final Office Action for U.S. Appl. No. 11/098,014 dated Jan. 23, 2009.
Non-Final Office Action for U.S. Appl. No. 11/098,014 dated Jun. 30, 2009.
Final Office Action for U.S. Appl. No. 11/098,014 dated Mar. 26, 2010.
Non-Final Office Action for U.S. Appl. No. 11/098,014 dated Nov. 3, 2010.
Notice of Allowance for U.S. Appl. No. 11/098,014 dated Mar. 16, 2011.
Non-Final Office Action for U.S. Appl. No. 11/098,016 dated Apr. 24, 2007.
Notice of Allowance for U.S. Appl. No. 11/098,016 dated Apr. 22, 2008.
Non-Final Office Action for U.S. Appl. No. 11/098,038 dated Aug. 28, 2006.
Final Office Action for U.S. Appl. No. 11/098,038 dated Jun. 7, 2007.
Non- Final Office Action for U.S. Appl. No. 11/098,038 dated Apr. 3, 2008.
Notice of Allowance for U.S. Appl. No. 11/098,038 dated Mar. 11, 2009.
Notice of Allowance for U.S. Appl. No. 11/098,038 dated May 29, 2009.
Non-Final Office Action for U.S. Appl. No. 11/098,042 dated Dec. 5, 2008.
Notice of Allowance for U.S. Appl. No. 11/098,042 dated Apr. 13, 2009.
Non-Final Office Action for U.S. Appl. No. 11/098,043 dated Jul. 23, 2007.
Final Office Action for U.S. Appl. No. 11/098,043 dated Apr. 17, 2008.
Non-Final Office Action for U.S. Appl. No. 11/098,043 dated Dec. 23, 2008.
Final Office Action for U.S. Appl. No. 11/098,043 dated Jul. 21, 2009.
Non-Final Office Action for U.S. Appl. No. 11/110,353 dated Jul. 27, 2007.
Non-Final Office Action for U.S. Appl. No. 11/110,353 dated Jun. 11, 2008.
Final Office Action for U.S. Appl. No. 11/110,353 dated Jan. 6, 2009.
Non-Final Office Action for U.S. Appl. No. 11/110,353 dated Sep. 15, 2009.
Notice of Allowance for U.S. Appl. No. 11/110,353 dated Dec. 2, 2009.
Non-Final Office Action for U.S. Appl. No. 11/131,945 dated Jan. 8, 2009.
Notice of Allowance for U.S. Appl. No. 11/131,945 dated Oct. 30, 2009.
Non-Final Office Action for U.S. Appl. No. 11/185,908 dated Dec. 14, 2009.
Final Office Action for U.S. Appl. No. 11/185,908 dated Jun. 28, 2010.
Non-Final Office Action for U.S. Appl. No. 11/208,408 dated Oct. 7, 2008.
Final Office Action for U.S. Appl. No. 11/208,408 dated May 11, 2009.
Non-Final Office Action for U.S. Appl. No. 11/208,408 dated Apr. 23, 2010.
Non-Final Office Action for U.S. Appl. No. 11/208,457 dated Oct. 9, 2007.
Non-Final Office Action for U.S. Appl. No. 11/208,458 dated Mar. 21, 2007.
Notice of Allowance for U.S. Appl. No. 11/208,458 dated Jun. 2, 2008.
Non-Final Office Action for U.S. Appl. No. 11/208,461 dated Sep. 29, 2009.
Non-Final Office Action for U.S. Appl. No. 11/208,461 dated Nov. 3, 2010.
Notice of Allowance for U.S. Appl. No. 11/208,461 dated Mar. 15, 2011.
Non-Final Office Action for U.S. Appl. No. 11/209,333 dated Apr. 29, 2010.
Notice of Allowance for U.S. Appl. No. 11/210,260 dated Jan. 13, 2010.
Non-Final Office Action for U.S. Appl. No. 11/236,330 dated Dec. 2, 2009.
Notice of Allowance for U.S. Appl. No. 11/236,330 dated Jun. 22, 2010.
Non-Final Office Action for U.S. Appl. No. 11/236,440 dated Jan. 22, 2009.
Final Office Action for U.S. Appl. No. 11/236,440 dated Jul. 22, 2009.
Non-Final Office Action for U.S. Appl. No. 11/365,983 dated Jan. 26, 2010.
Final Office Action for U.S. Appl. No. 11/365,983 dated Sep. 14, 2010.
Non-Final Office Action for U.S. Appl. No. 11/547,835 dated Dec. 29, 2010.
Non-Final Office Action for U.S. Appl. No. 11/672,014 dated May 6, 2010.
Notice of Allowance for U.S. Appl. No. 11/672,014 dated Feb. 28, 2011.
Non-Final Office Action for U.S. Appl. No. 11/758,866 dated Jun. 14, 2010.
Non-Final Office Action for U.S. Appl. No. 11/972,562 dated Apr. 21, 2010.
Non-Final Office Action for U.S. Appl. No. 12/538,731 dated Jun. 28, 2010.
Notice of Allowance for U.S. Appl. No. 12/538,731 dated Oct. 18, 2010.
Non-Final Office Action for U.S. Appl. No. 12/541,891 dated Dec. 9, 2010.
Non-Final Office Action for U.S. Appl. No. 12/542,816 dated Jun. 18, 2010.
Notice of Allowance for U.S. Appl. No. 12/542,816 dated Jan. 3, 2011.
Notice of Allowance for U.S. Appl. No. 12/542,816 dated Apr. 27, 2011.
Non-Final Office Action for U.S. Appl. No. 12/721,456 dated Mar. 1, 2011.
Non-Final Office Action for U.S. Appl. No. 12/887,473 dated Feb. 4, 2011.
Non-Final Office Action for U.S. Appl. No. 12/889,321 dated Mar. 31, 2011.
Non-Final Office Action for U.S. Appl. No. 12/904,064 dated Mar. 30, 2011.
King et al., U.S. Appl. No. 11/432,731, filed May 11, 2006.
King et al., U.S. Appl. No. 11/933,204, filed Oct. 21, 2007.
King et al., U.S. Appl. No. 11/952,885, filed Dec. 7, 2007.
King et al., U.S. Appl. No. 12/517,352, filed Jun. 2, 2009.
King et al., U.S. Appl. No. 12/517,541, filed Jun. 3, 2009.
King et al., U.S. Appl. No. 12/728,144, filed Mar. 19, 2010.
King et al., U.S. Appl. No. 12/884,139, filed Sep. 16, 2010.

(56) References Cited

OTHER PUBLICATIONS

King et al., U.S. Appl. No. 12/894,059, filed Sep. 29, 2010.
King et al., U.S. Appl. No. 12/902,081, filed Oct. 11, 2010.
King et al., U.S. Appl. No. 12/904,064, filed Oct. 13, 2010.
King et al., U.S. Appl. No. 12/961,407, filed Dec. 6, 2010.
King et al., U.S. Appl. No. 12/964,662, filed Dec. 9, 2010.
King et al., U.S. Appl. No. 13/031,316, filed Feb. 21, 2011.
European Search Report for EP Application No. 05731509 dated Apr. 23, 2009.
European Search Report for EP Application No. 05732913 dated Mar. 31, 2009.
European Search Report for EP Application No. 05733191 dated Apr. 23, 2009.
European Search Report for EP Application No. 05733819 dated Mar. 31, 2009.
European Search Report for EP Application No. 05733851 dated Sep. 2, 2009.
European Search Report for EP Application No. 05733915 dated Dec. 30, 2009.
European Search Report for EP Application No. 05734996 dated Mar. 23, 2009.
European Search Report for EP Application No. 05735008 dated Feb. 16, 2011.
European Search Report for EP Application No. 05737714 dated Mar. 31, 2009.
European Search Report for EP Application No. 05734796 dated Apr. 22, 2009.
European Search Report for EP Application No. 05734947 dated Mar. 20, 2009.
European Search Report for EP Application No. 05742065 dated Mar. 23, 2009.
European Search Report for EP Application No. 05745611 dated Mar. 23, 2009.
European Search Report for EP Application No. 05746428 dated Mar. 24, 2009.
European Search Report for EP Application No. 05746830 dated Mar. 23, 2009.
European Search Report for EP Application No. 05753019 dated Mar. 31, 2009.
European Search Report for EP Application No. 05789280 dated Mar. 23, 2009.
European Search Report for EP Application No. 05812073 dated Mar. 23, 2009.
European Search Report for EP Application No. 07813283 dated Dec. 10, 2010.
International Search Report for PCT/EP2007/005038 dated Sep. 17, 2007.
International Search Report for PCT/EP2007/007824 dated May 25, 2009.
International Search Report for PCT/EP2007/008075 dated Oct. 10, 2008.
International Search Report for PCT/US2005/011012 dated Sep. 29, 2006.
International Search Report for PCT/US2005/011013 dated Oct. 19, 2007.
International Search Report for PCT/US2005/011014 dated May 16, 2007.
International Search Report for PCT/US2005/011015 dated Dec. 1, 2006.
International Search Report for PCT/US2005/011016 dated May 29, 2007.
International Search Report for PCT/US2005/011017 dated Jul. 15, 2008.
International Search Report for PCT/US2005/011026 dated Jun. 11, 2007.
International Search Report for PCT/US2005/011042 dated Sep. 10, 2007.
International Search Report for PCT/US2005/011043 dated Sep. 20, 2007.
International Search Report for PCT/US2005/011084 dated Aug. 8, 2008.
International Search Report for PCT/US2005/011085 dated Sep. 14, 2006.
International Search Report for PCT/US2005/011088 dated Aug. 29, 2008.
International Search Report for PCT/US2005/011089 dated Jul. 8, 2008.
International Search Report for PCT/US2005/011090 dated Sep. 27, 2006.
International Search Report for PCT/US2005/011533 dated Jun. 4, 2007.
International Search Report for PCT/US2005/011534 dated Nov. 9, 2006.
International Search Report for PCT/US2005/012510 dated Jan. 6, 2011.
International Search Report for PCT/US2005/013297 dated Aug. 14, 2007.
International Search Report for PCT/US2005/013586 dated Aug. 7, 2009.
International Search Report for PCT/US2005/017333 dated Jun. 4, 2007.
International Search Report for PCT/US2005/025732 dated Dec. 5, 2005.
International Search Report for PCT/US2005/029534 dated May 15, 2007.
International Search Report for PCT/US2005/029536 dated Apr. 19, 2007.
International Search Report for PCT/US2005/029537 dated Sep. 28, 2007.
International Search Report for PCT/US2005/029539 dated Sep. 29, 2008.
International Search Report for PCT/US2005/029680 dated Jul. 13, 2010.
International Search Report for PCT/US2005/030007 dated Mar. 11, 2008.
International Search Report for PCT/US2005/034319 dated Apr. 17, 2006.
International Search Report for PCT/US2005/034734 dated Apr. 4, 2006.
International Search Report for PCT/US2006/007108 dated Oct. 30, 2007.
International Search Report for PCT/US2006/018198 dated Sep. 25, 2007.
International Search Report for PCT/US2007/074214 dated Sep. 9, 2008.
International Search Report for PCT/US2010/000497 dated Sep. 27, 2010.
International Search Report for PCT/US2010/000498 dated Aug. 2, 2010.
International Search Report for PCT/US2010/000499 dated Aug. 31, 2010.
International Search Report for PCT/US2010/027254 dated Oct. 22, 2010.
International Search Report for PCT/US2010/027255 dated Nov. 16, 2010.
International Search Report for PCT/US2010/027256 dated Nov. 15, 2010.
International Search Report for PCT/US2010/028066 dated Oct. 26, 2010.

\* cited by examiner

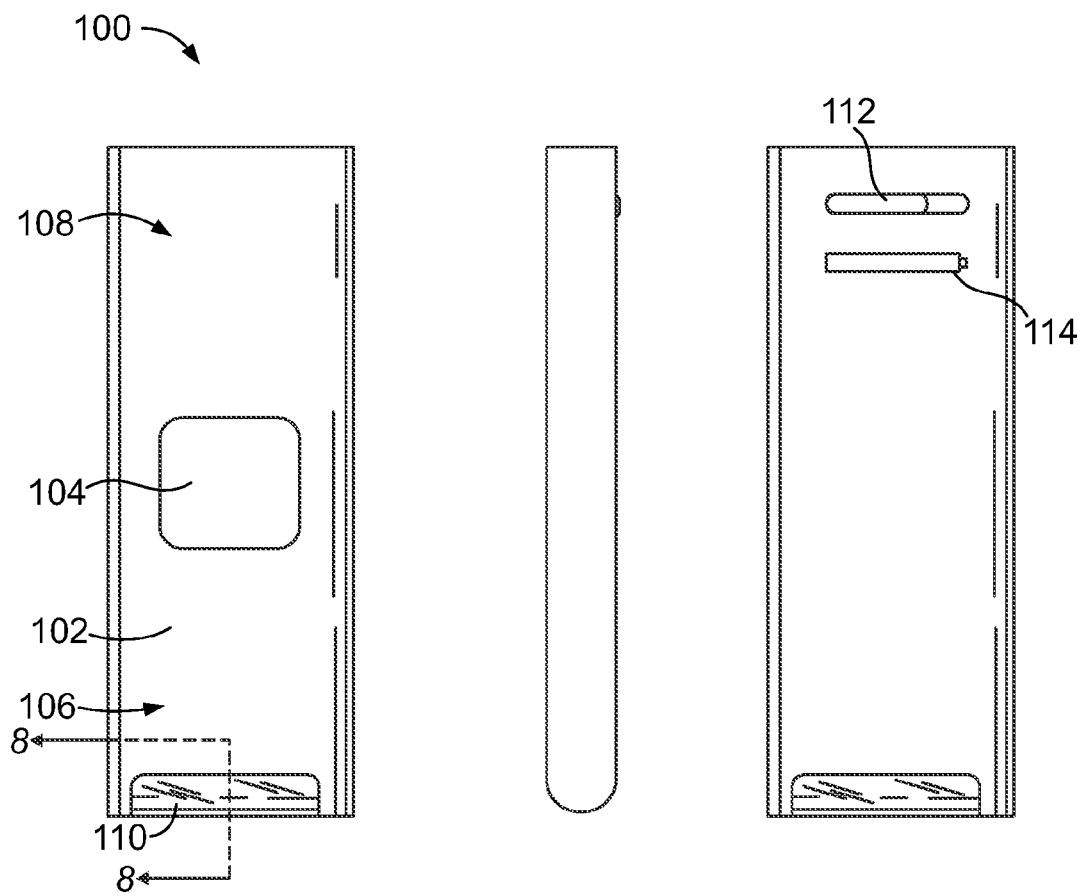
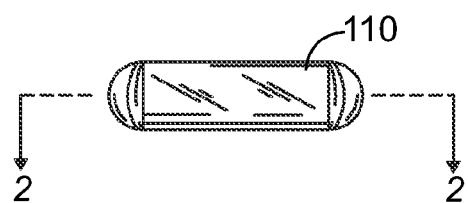

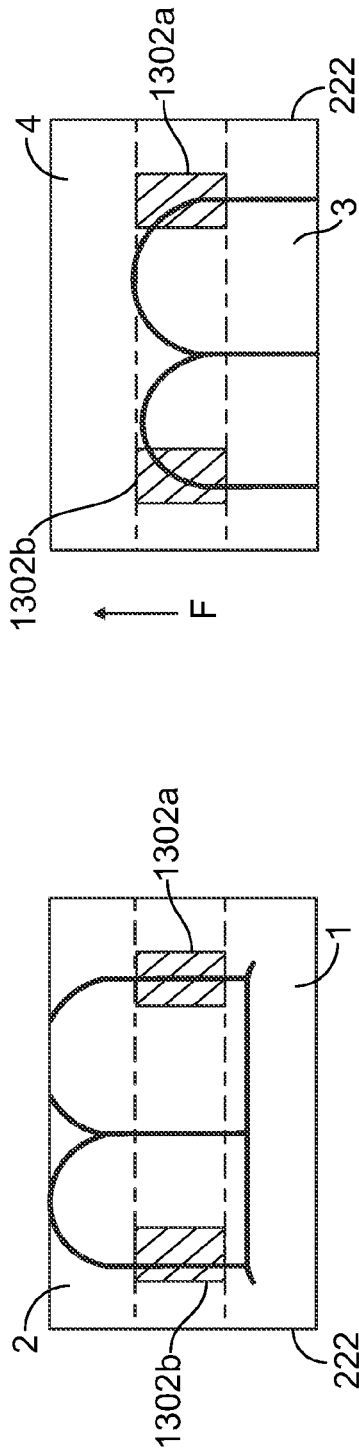
FIG. 13A
FIG. 13B
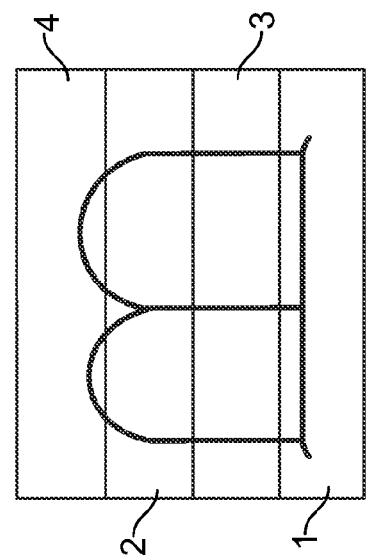
FIG. 14

OPTICAL SCANNERS, SUCH AS HAND-HELD OPTICAL SCANNERS

CROSS-REFERENCE TO RELATED APPLICATIONS INCORPORATED BY REFERENCE

The present application is a Continuation of U.S. application Ser. No. 12/517,352 filed Jun. 2, 2009, now abandoned which application is a National Stage Entry of PCT/EP2007/007824, filed Sep. 7, 2007 and claims priority to the following U.S. Provisional Patent Applications, each of which is hereby incorporated by reference in its entirety: U.S. Provisional Patent Application No. 60/843,362, filed on Sep. 8, 2006, entitled OPTICAL SCANNERS, SUCH AS HAND-HELD OPTICAL SCANNERS, U.S. Provisional Patent Application No. 60/844,894, filed on Sep. 15, 2006, entitled OPTICAL SCANNERS, SUCH AS HAND-HELD OPTICAL SCANNERS, and U.S. Provisional Patent Application No. 60/845,604, filed on Sep. 18, 2006, entitled OPTICAL SCANNERS, SUCH AS HAND-HELD OPTICAL SCANNERS.

This application is also related to the following U.S. Patent Applications, each of which is hereby incorporated by reference in its entirety: U.S. patent application Ser. No. 11/004,637 filed on Dec. 3, 2004, U.S. patent application Ser. No. 11/097,103, filed on Apr. 1, 2005, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/097,961, filed Apr. 1, 2005, entitled METHODS AND SYSTEMS FOR INITIATING APPLICATION PROCESSES BY DATA CAPTURE FROM RENDERED DOCUMENTS, U.S. patent application Ser. No. 11/097,093, filed Apr. 1, 2005, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, filed Apr. 1, 2005, entitled CONTENT ACCESS WITH HANDHELD DOCUMENT DATA CAPTURE DEVICES, U.S. patent application Ser. No. 11/098,014, filed Apr. 1, 2005, entitled SEARCH ENGINES AND SYSTEMS WITH HANDHELD DOCUMENT DATA CAPTURE DEVICES, U.S. patent application Ser. No. 11/098,043, filed Apr. 1, 2005, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, filed Apr. 1, 2005, entitled INFORMATION GATHERING SYSTEM AND METHOD, U.S. patent application Ser. No. 11/097,089, filed Apr. 1, 2005, entitled DOCUMENT ENHANCEMENT SYSTEM AND METHOD, U.S. patent application Ser. No. 11/097,835, filed Apr. 1, 2005, entitled PUBLISHING TECHNIQUES FOR ADDING VALUE TO A RENDERED DOCUMENT, U.S. patent application Ser. No. 11/098,016, filed Apr. 1, 2005, entitled ARCHIVE OF TEXT CAPTURES FROM RENDERED DOCUMENTS, U.S. patent application Ser. No. 11/097,828, filed Apr. 1, 2005, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, filed Apr. 1, 2005, entitled AGGREGATE ANALYSIS OF TEXT CAPTURES PERFORMED BY MULTIPLE USERS FROM RENDERED DOCUMENTS, U.S. patent application Ser. No. 11/097,836, filed Apr. 1, 2005, entitled ESTABLISHING AN INTERACTIVE ENVIRONMENT FOR RENDERED DOCUMENTS, U.S. patent application Ser. No. 11/098,042, filed Apr. 1, 2005, entitled DATA CAPTURE FROM RENDERED DOCUMENTS USING HANDHELD DEVICE, U.S. patent application Ser. No. 11/096,704, filed Apr. 1, 2005, entitled CAPTURING TEXT FROM RENDERED DOCUMENTS USING SUPPLEMENTAL INFORMATION, U.S. patent application Ser. No. 11/110,353, filed Apr. 19, 2005, entitled PROCESSING TECHNIQUES FOR VISUAL CAPTURE DATA FROM A RENDERED DOCUMENT, U.S. patent application Ser. No. 11/131,945, filed May 17, 2005, entitled PROCESSING TECHNIQUES FOR TEXT CAPTURE FROM A RENDERED DOCUMENT, U.S. patent application Ser. No. 11/185,908, filed Jul. 19, 2005, entitled AUTOMATIC MODIFICATION OF WEB PAGES, U.S. patent application Ser. No. 11/208,408, filed Aug. 18, 2005, entitled SCANNER HAVING CONNECTED AND UNCONNECTED OPERATIONAL BEHAVIORS, U.S. patent application Ser. No. 11/208,457, filed Aug. 18, 2005, entitled LOCATING ELECTRONIC INSTANCES OF DOCUMENTS BASED ON RENDERED INSTANCES, DOCUMENT FRAGMENT DIGEST GENERATION, AND DIGEST BASED DOCUMENT FRAGMENT DETERMINATION, U.S. patent application Ser. No. 11/208,458, filed Aug. 18, 2005, entitled METHODS, SYSTEMS AND COMPUTER PROGRAM PRODUCTS FOR DATA GATHERING IN A DIGITAL AND HARD COPY DOCUMENT ENVIRONMENT, U.S. patent application Ser. No. 11/208,461, filed Aug. 18, 2005, entitled APPLYING SCANNED INFORMATION TO IDENTIFY CONTENT, U.S. patent application Ser. No. 11/209,333, filed Aug. 23, 2005, entitled A PORTABLE SCANNING DEVICE, U.S. patent application Ser. No. 11/210,260, filed Aug. 23, 2005, entitled A METHOD AND SYSTEM FOR CHARACTER RECOGNITION, U.S. patent application Ser. No. 11/236,440, filed Sep. 27, 2005, entitled SECURE DATA GATHERING FROM RENDERED DOCUMENTS, U.S. patent application Ser. No. 11/236,330, filed Sep. 27, 2005, entitled HANDHELD DEVICE FOR CAPTURING TEXT FROM BOTH A DOCUMENT PRINTED ON PAPER AND A DOCUMENT DISPLAYED ON A DYNAMIC DISPLAY DEVICE, U.S. patent application Ser. No. 11/365,983, filed Feb. 28, 2006, entitled ASSOCIATION OF A PORTABLE SCANNER WITH INPUT/OUTPUT AND STORAGE DEVICES, U.S. patent application Ser. No. 11/432,731, filed May 11, 2006, entitled A PORTABLE SCANNING AND MEMORY DEVICE, International Patent Application No. PCT/US05/11533, filed Apr. 1, 2005, entitled A SYSTEM AND METHOD FOR CHARACTER RECOGNITION, International Patent Application No. PCT/US05/13586, filed Apr. 6, 2005, entitled SCANNING APPARATUS AND RELATED TECHNIQUES, International Patent Application No. PCT/US05/12510, filed Apr. 12, 2005, entitled ADDING VALUE TO A RENDERED DOCUMENT.

This application is further related to the following U.S. Provisional Patent Applications, each of which is hereby incorporated by reference in its entirety: Application No. 60/559,226 filed on Apr. 1, 2004, Application No. 60/558,893 filed on Apr. 1, 2004, Application No. 60/558,968 filed on Apr. 1, 2004, Application No. 60/558,867 filed on Apr. 1, 2004, Application No. 60/559,278 filed on Apr. 1, 2004, Application No. 60/559,279 filed on Apr. 1, 2004, Application No. 60/559,265 filed on Apr. 1, 2004, Application No. 60/559,277 filed on Apr. 1, 2004, Application No. 60/558,969 filed on Apr. 1, 2004, Application No. 60/558,892 filed on Apr. 1, 2004, Application No. 60/558,760 filed on Apr. 1, 2004, Application No. 60/558,717 filed on Apr. 1, 2004, Application No. 60/558,499 filed on Apr. 1, 2004, Application No. 60/558,370 filed on Apr. 1, 2004, Application No.

60/558,789 filed on Apr. 1, 2004, Application No. 60/558,791 filed on Apr. 1, 2004, Application No. 60/558,527 filed on Apr. 1, 2004, Application No. 60/559,125 filed on Apr. 2, 2004, Application No. 60/558,909 filed on Apr. 2, 2004, Application No. 60/559,033 filed on Apr. 2, 2004, Application No. 60/559,127 filed on Apr. 2, 2004, Application No. 60/559,087 filed on Apr. 2, 2004, Application No. 60/559,131 filed on Apr. 2, 2004, Application No. 60/559,766 filed on Apr. 6, 2004, Application No. 60/561,768 filed on Apr. 12, 2004, Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667, filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005; Application No. 60/811,623, filed Jun. 6, 2006 and 60/833,131, filed Jul. 24, 2006.

TECHNICAL FIELD

The following disclosure relates generally to optical scanning devices and related systems.

BACKGROUND

Optical scanning devices digitize images and text and translate the information into a machine-readable form a computer can use. The image data can then be used in a number of different ways. For example, the data can be used by a personal computer to reproduce an image of the scanned object on a display device or a printer. The data can also be used by a computer to find and retrieve an electronic version of all or a portion of the original document or source.

There are numerous types of optical scanners, including both fixed scanners (e.g., conventional copy machines) and portable scanners (e.g., hand-held scanning devices). As the name implies, a hand-held optical scanner can be held in a user's hand and moved over the text or image the user desires to scan. The image data can then be stored in scanner memory for later download, or downloaded directly to an associated computer or other processing device via a cable or wireless connection.

BRIEF DESCRIPTION OF THE DRAWINGS

FIGS. 1A-1D are top, side, bottom, and end views, respectively, of a configuration of a hand-held optical scanner.

FIGS. 13A and 13B are schematic diagrams of sequential scan images illustrating various stages in a method of image processing.

FIG. 14 is a schematic diagram of a processed image composed of portions of the scan images illustrated in FIGS. 13A and 13B.

DETAILED DESCRIPTION

Figure 2:
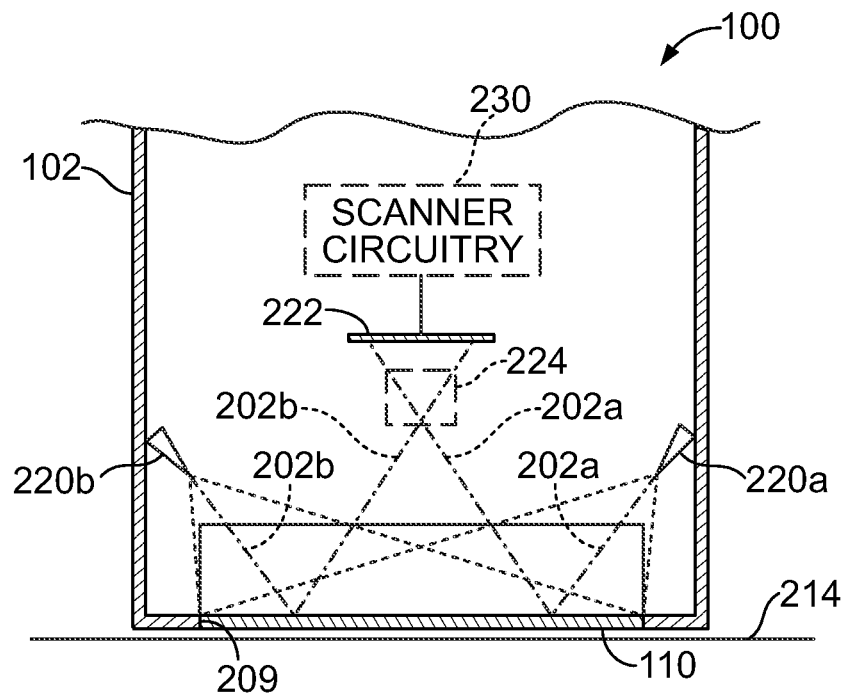
FIG. 2 is a cross-sectional top view of a portion of the optical scanner of FIG. 1, illustrating a scan window and other features of the optical scanner.

The following disclosure describes various embodiments of optical scanners, such as hand-held optical scanners, and related features. For example, many of the scanner configurations described below can include transparent or translucent scan windows through which internal light sources (e.g., LEDs) illuminate a scan region. Various features are also described below to minimize or reduce specular reflection of light off the scan window, as this could adversely affect the scan image. These features can include partial light shields, sequential lighting/image processing, diffuse light sources, polarizing filters, etc.

Other scanner configurations described below can include scan windows which have contoured or shaped surfaces to magnify or reduce the scan image, thereby altering the field of view or otherwise enhancing the imaging characteristics of the scanner. Still other scanner configurations described below can include a first image sensor positioned toward one end of the scanner and a second image sensor positioned toward one side of the scanner. In one scanner configuration, for example, the first image sensor can be a two-dimensional image sensor for capturing a particular set of markings (e.g., a particular sentence), and the second image sensor can be a one-dimensional image sensor for capturing a broader portion of markings (e.g., a full paragraph or page of text) in a single pass of the scanner.

Certain details are set forth in the following description to provide a thorough understanding of the different embodiments of the invention. However, other details describing well-known features, systems and methods often associated with optical scanners and related processing systems are not set forth below, to avoid unnecessarily obscuring the description of the various embodiments.

Many of the details, dimensions, angles and other features shown in the Figures are merely illustrative of particular embodiments described herein. Accordingly, other embodiments can have other details, dimensions, angles and features without departing from the scope of the present disclosure. Furthermore, additional embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

FIGS. 1A-1D are related top, side, bottom, and end views, respectively, of a hand-held optical scanner 100. Referring first to FIG. 1A, the hand-held optical scanner 100 ("scanner 100") includes a durable body 102 suitable for single-handed operation by a user (not shown). The body 102 can be formed from, e.g., aluminum, plastic, and/or other suitable materials. The scanner 100 also includes an operating button 104 conveniently disposed in a mid-portion of the body 102, and a transparent or translucent scan window 110 disposed toward an end portion of the body 102. The scan window 110 can be produced from a number of different materials, including various types of plastic, glass, and/or other materials known in the art that are suitably transparent or translucent.

In the illustrated embodiment, the top surface of the scanner 100 includes a scan diagnostics area 106 and a text area 108. The scan diagnostics area 106 can include various types of lights and/or other features to indicate the mode of operation or status of the scanner. For example, the scan diagnostics area 106 can include a light (e.g., a red light) that illuminates to indicate that scanning has begun. Additionally, such a light can be aligned with the scan window 110 to help the user center the scanner 100 over the text or other image he or she wishes to scan. In another aspect of this particular embodiment, the light on the scan diagnostics area can be illuminated in a different color (for example, green) to indicate that a scanned document has been identified.

The text area 108 can include, for example, an organic light emitting diode (OLED) for providing textual information about the operation of the scanner 100. For example, in one embodiment, the text area 108 can illuminate a "scanning" text message once scanning has begun, and a "document found" text message when the scanned document has been identified by an associated computer system. Although not illustrated in FIGS. 1A-1D, the scanner 100 can be operably connected to an associated computer or other suitable processing device via a wireless connection (e.g., a Bluetooth), or a cable connection (e.g., a mini-USB cable connection).

In addition to the foregoing features, the scanner 100 can also include a microphone (not shown) that is enabled when the user depresses the operating button 104. With this feature, the user can record verbal notes with the scanner 100 by speaking into the microphone before, after, or while positioning the scan window 110 in view of text or other images.

In some embodiments, at times at which the scanner is enabled, such as subsequent to the button 104 being depressed, the scanner automatically determines whether the optical channel, the voice channel, or both are active. For example, in some embodiments, if the scanner is receiving consistently high-volume audio, the scanner determines that the audio channel is active, and records audio data received via the audio channel. In some embodiments, the scanner determines whether the optical sensor is receiving data corresponding to in-focus text that is moving through the field of view, and, if so, determines that the visual channel is active, and records image data received via the visual channel.

Referring next to FIG. 1C, a capacity indicator 114 on the bottom surface of the scanner 100 can provide a visual indication of how much life remains in the scanner battery(ies). In addition, the bottom surface of the scanner 100 can also include a memory low indicator (not shown) that illuminates when storage capacity becomes low, or reads "memory full" when there is no more storage space available. Moving a hold switch 112 to an "off" position disables the scanner 100 and prevents inadvertently depressing the button 104 and turning the scanner 100 on during, e.g., transportation in the user's pocket.

Although various features of the scanner 100 have been described above for purposes of illustration and completeness, the various configurations and features disclosed herein are not limited to this particular scanner configuration. Indeed, many, if not all, of the inventive features described below can be incorporated into a wide variety of scanning devices, as will be clear to those of ordinary skill in the art.

FIG. 2 is a cross-sectional top view of the scanner 100 taken substantially along line 2-2 in FIG. 1D. In one aspect of this embodiment, the scanner 100 can include one or more light sources 220 (identified individually as a first light source 220a and a second light source 220b) positioned within the body 102. The light sources 220 can include various types of lights including, for example, light emitting diodes (LEDs), incandescent lights, fluorescent lights, etc. During operation of the scanner 100, light from the sources 220 passes through the scan window 110 to illuminate text, images, and/or other markings (not shown) in a scan region on a page or other document 214. In the illustrated embodiment, an optical system 224 (shown schematically) directs image light from the illuminated scan region to an image sensor 222. Although not shown in detail, the optical system 224 can include one or more lenses to focus the image light on the sensor 222.

The image sensor 222 can include a coupled-charge device (CCD), a complementary metal oxide semiconductor (CMOS) device, a contact image sensor (CIS) device, and/or other suitable image sensing devices known in the art. The image sensor 222 is operably connected to scanner circuitry 230 (shown schematically) for, e.g., amplification, noise filtering, and/or analog-to-digital conversion of signals passing from the image sensor 222 to a scanner CPU (not shown). Although not shown, the scanner CPU can be operably connected to memory, one or more display devices, and/or one or more input/output devices associated with the scanner 100.

Although the scan window 110 is positioned slightly above the document 214 in FIG. 2 for purposes of clarity, in practice the scanner 100 can have other positions relative to the surface of the document 214. For example, in one embodiment the scan window 110 can be positioned directly on the image surface. In other embodiments, the scan window 110 can be held further away from the image surface than depicted in FIG. 2.

As mentioned above, during operation of the scanner 100, light from the light sources 220 passes through the scan window 110 to illuminate the adjacent portion of the document 214. In some instances, however, at least a portion of the light from the sources 220 may be reflected by the scan window 110, causing glare which strikes the image sensor 222 and adversely affects the resulting image. By way of example, this specular reflection can be illustrated by a first light ray 202a emitted from the first light source 220a, and a second light ray 202b emitted from the second light source 220b. Various approaches for minimizing or at least reducing this specular reflection and its adverse effects are described in more detail below with reference to FIGS. 3-6.

Figure 3:
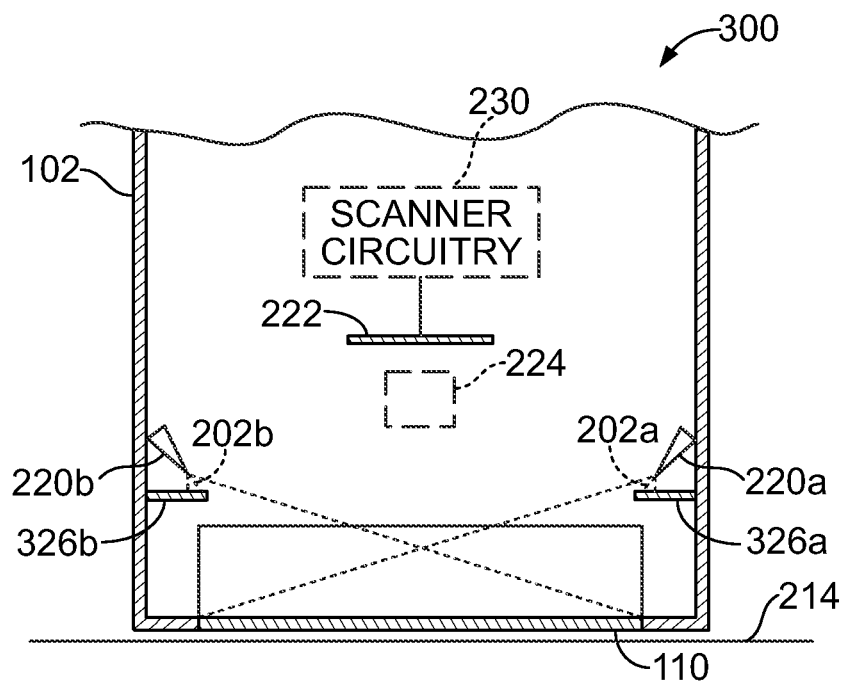
FIG. 3 is a cross-sectional top view of a portion of an optical scanner configuration having internal light shields for minimizing or reducing specular reflection.

FIG. 3 is a cross-sectional top view of a portion of a scanner 300 that is at least generally similar in structure and function to this scanner 100 described above with reference to FIGS. 1A-2. In one aspect of this particular embodiment, however, the scanner 300 includes a first light shield 326a and a second light shield 326b positioned within the scanner body 102. Each of the light shields 326 is positioned to block the portion of light from the corresponding light source 220 that would otherwise reflect off the scan window 110 and adversely affect the resulting scan image. For example, in the illustrated embodiment, the first light shield 326a extends inwardly from the scanner body 102 to block the first light ray 202a from reaching the scan window 110. Similarly, the second light shield 326b extends inwardly from an opposing side of the scanner body 102 to block the second light ray 202b from striking the scan window 110. As a result, little or no specular reflection from the scan window 110 reaches the image sensor 222 to obscure the resulting scan image. Furthermore, although the light shields 326 block a portion of the light from the light sources 220, the light sources 220 together still provide enough illumination for a suitable scan of the document 214.

Although one arrangement of the light sources 220 and the light shields 326 is shown in FIG. 3 for illustrative purposes, various other arrangements of light sources and light shields can be used without departing from the scope of the present disclosure. For example, in other embodiments, a single light shield can be used to block specular reflection from two or more light sources. In some embodiments, light shields can be attached to one or both of the front or back walls of the scanner body 102, instead of the side wall as shown if FIG. 3. In such embodiments, the light shield can extend in front of the light source to block the rays causing the specular reflection, while still allowing light to pass on either side of the light shield and illuminate the scan region. In some embodiments, opaque cylindrical sleeves surrounding all or a portion of the light source not facing the scan window are used as light shields. In some embodiments, light emitting diodes or other light sources manufactured to emit light only at the end of their structure facing the scan window are used to create a similar effect.

Figure 4A:
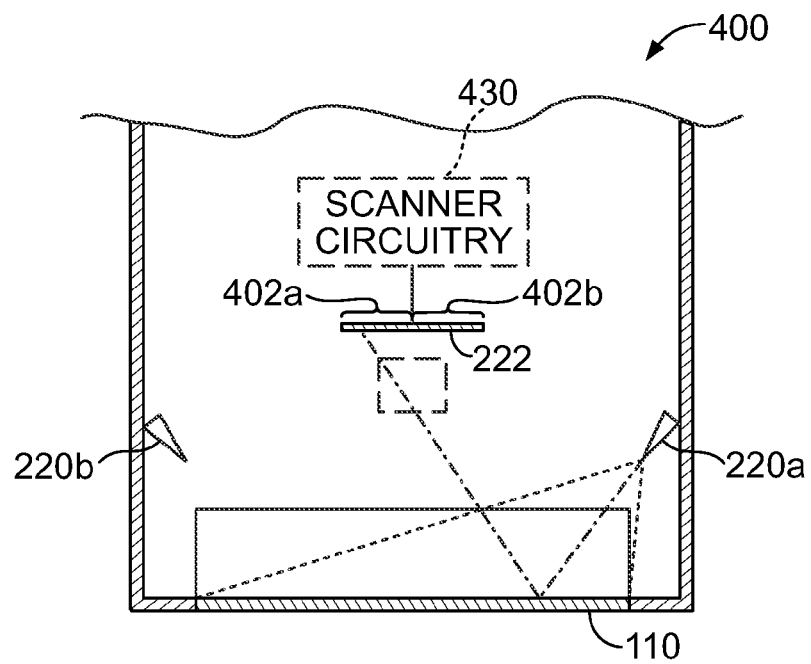
FIGS. 4A and 4B are cross-sectional top views of a portion of an optical scanner illustrating various stages in a method of sequential lighting.
Figure 4B:
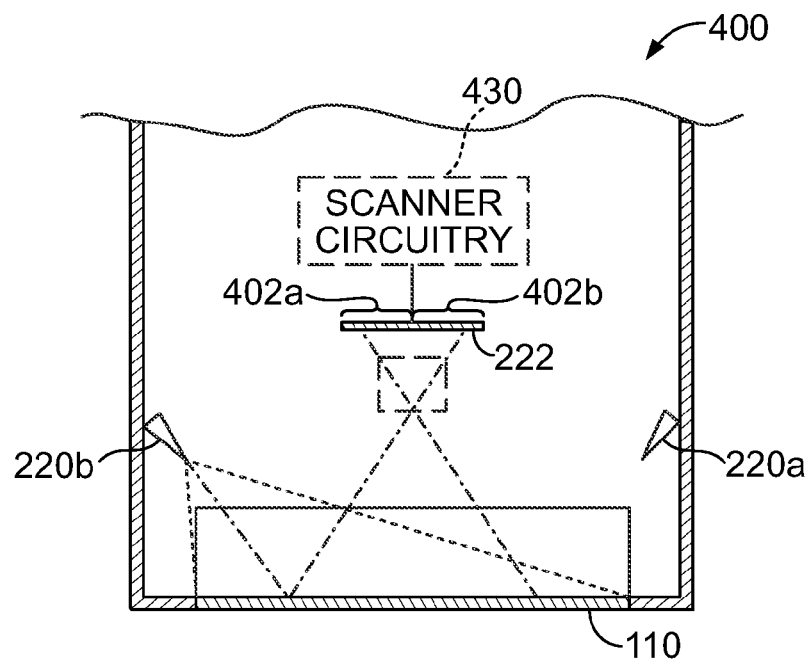

FIGS. 4A and 4B are cross-sectional top views of a portion of a hand-held optical scanner 400. Many features of the scanner 400 are at least generally similar in structure and function to corresponding features of the scanner 100 described above with reference to FIGS. 1A-2. For example, the scanner 400 can include the light sources 220 for illuminating the scan region, the image sensor 222 for capturing the illuminated image, and scanner circuitry 430 for processing information from the image sensor 222.

In one aspect of this particular embodiment, however, the individual light sources 220 are operatively connected to a controller (not shown), and are sequentially cycled off and on in relatively short time intervals during operation of the scanner 400. More specifically, when the first light source 220a is cycled on as shown in FIG. 4A, the second light source 220b is cycled off. Conversely, when the first light source 220a is cycled off as shown in FIG. 4B, the second light source 220b is cycled on. When the first light source 220a is on, it can cause specular reflection that adversely affects the scan image on a first sensor region 402a. Conversely, when the second light source is on, it can cause specular reflection that adversely affects the scan image on a second sensor region 402b.

To minimize or reduce any adverse affects from the specular reflection described above, the scanner circuitry 430 is configured to only record a portion of the scan image received by the image sensor 222 at any given time. More specifically, when the first light source 220a is on and possibly causing specular reflection in the first sensor region 402a, then the scanner circuitry 430 only records the portion of the scan image corresponding to the second sensor region 402b. Similarly, when the second light source 220b is on and possibly causing specular reflection in the second sensor region 402b, then the scanner circuitry 430 only records the portion of the scan image corresponding to the first sensor region 402a. The recorded scan image portions are then assembled or "stitched" together by the scanner circuitry 430 to form a complete and unobscured scan image, as described in more detail below with reference to FIGS. 4C and 4D.

Figure 4C:
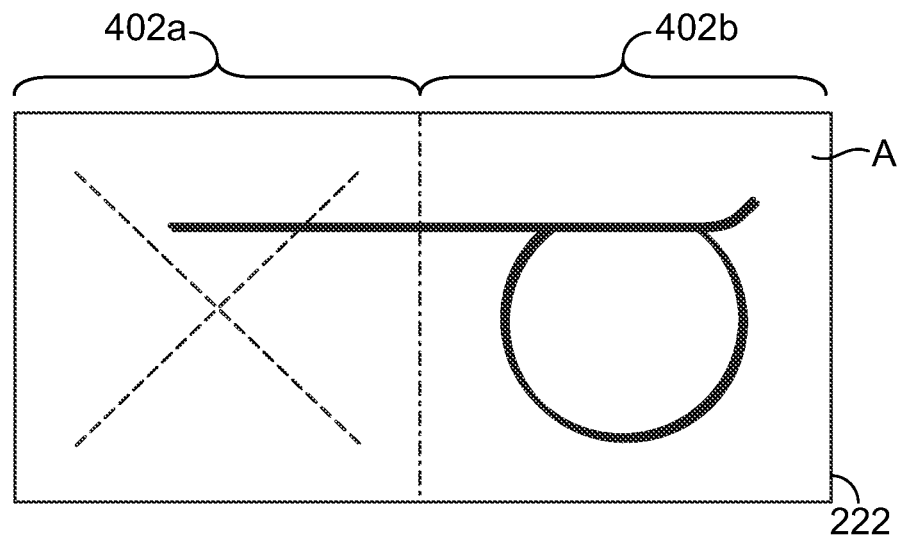
FIGS. 4C and 4D are schematic diagrams illustrating various stages in a related method of image processing.
Figure 4D:
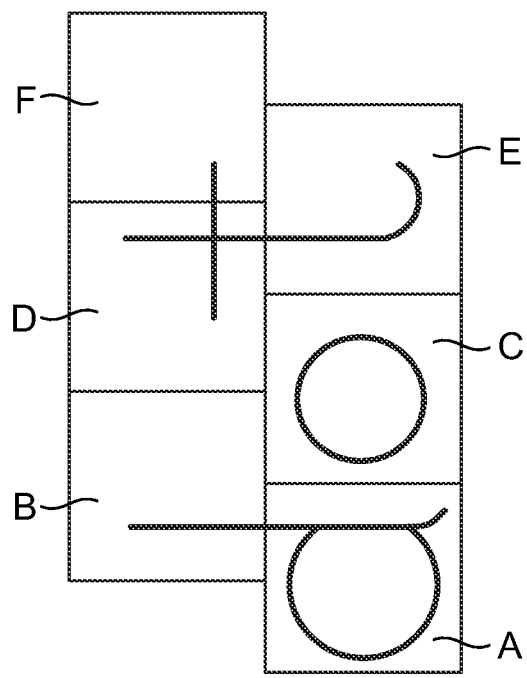

FIG. 4C illustrates a scan image of the letter "d" captured by the image sensor 222 when the first light source 220a is on and the second light source 220b is off, as shown in FIG. 4A. As shown in FIG. 4C, the first light source 220a may produce some glare (represented by the "X") that obscures a portion of the scan image in the first sensor region 402a. At this time, the scanner circuitry 430 (FIGS. 4A and 4B) only records the portion of the scan image in the second sensor region 402b. For ease of reference, this recorded image portion is referred to herein as frame A. A fraction of a second later, the first light source 220a is turned off and the second light source is turned on. At that time, the scanner circuitry 430 only records the portion of the scan image in the first sensor region 402a. This results in frame B as shown in FIG. 4D which the scanner circuitry 430 orients to frame A to form the complete letter "d." The foregoing process repeats as the scanner 400 moves across the page or other object it is scanning, thereby assembling an accurate representation of the scanned subject matter.

Figure 5:
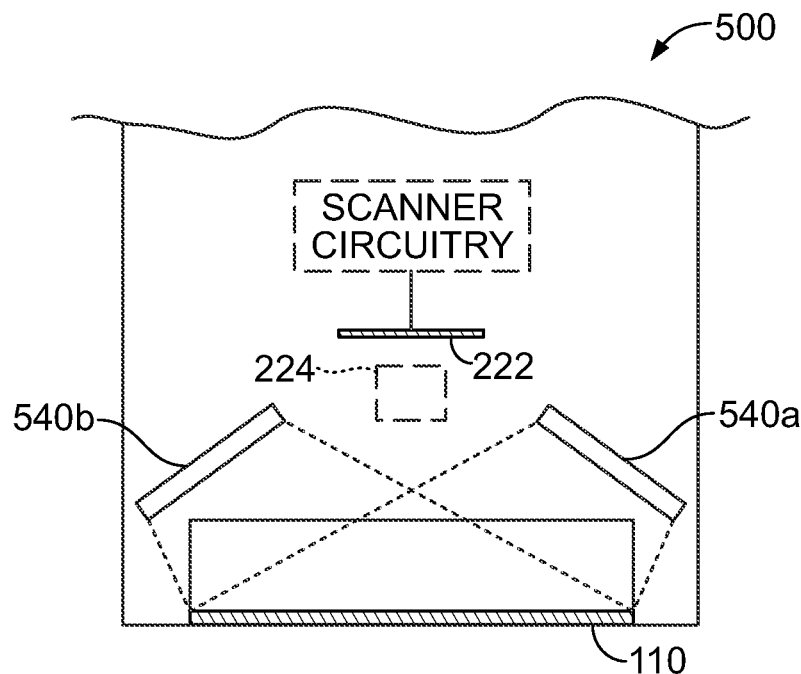
FIG. 5 is a cross-sectional top view of a portion of an optical scanner configuration that utilizes one or more diffused light sources.

FIG. 5 is a cross-sectional top view of a portion of a handheld optical scanner 500. Many features of the scanner 500 are at least generally similar in structure and function to corresponding features of the scanner 100 described above with reference to FIGS. 1A-2. For example, the scanner 500 includes the scan window 110, the optical system 224, and the image sensor 222. In one aspect of this particular embodiment, however, the scanner 500 can include one or more diffuse light sources 540 (identified individually as a first diffuse light source 540a and a second diffuse light source 540b) for illuminating the scan region (not shown). The diffuse light sources 540 can be various types of light sources including, for example, fluorescent light sources. In other embodiments, the diffuse light sources 540 can be incandescent and/or LED light sources that utilize a suitable diffusing element to diffuse the light. One advantage of using diffuse light sources is that the diffuse light may produce little or no specular reflection off the scan window 110, thereby providing an unobscured view to the image sensor 222.

Figure 6:
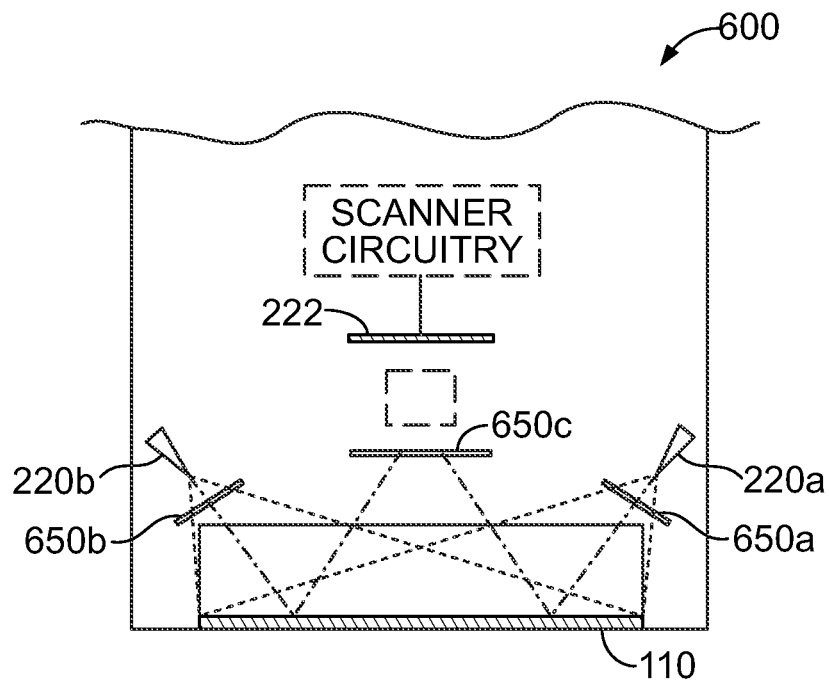
FIG. 6 is a cross-sectional top view of a portion of an optical scanner configuration that utilizes one or more light polarizing filters.

FIG. 6 is a cross-sectional top view of a portion of an optical scanner 600. Many features of the scanner 600 are at least generally similar in structure and function to corresponding features of the scanner 100 described above with reference to FIGS. 1A-2. In this particular embodiment, however, the scanner 600 can include one or more polarizing filters 650 (identified individually as a first polarizing filter 650a, a second polarizing filter 650b, and a third polarizing filter 650c) to reduce or eliminate any specular reflection from the light sources 220 off the scan window 110. For example, in the illustrated embodiment, the first polarizing filter 650a is positioned in front of the first light source 220a to polarize the light emitted from the first light source 220a. If, however, the first polarizing filter 650a is insufficient to eliminate the specular reflection caused by the first light source 220a, then the third polarizing filter 650c can be placed in front of the image sensor 222 to filter out any remaining glare.

In one embodiment, the first polarizing filter 650a can be configured to polarize the light emitted by the first light source 220a along a first axis (not shown), and the third polarizing filter 650c can be configured to cross-polarize the light entering the image sensor 222 along a second axis that is at least approximately perpendicular to the first axis. In other embodiments, other types of polarizing filters and other filter arrangements can be used to reduce or eliminate glare from the light sources 220. In one other embodiment, for example, a single polarizing filter in the position of the third polarizing filter 650c may be sufficient to reduce or minimize any adverse specular reflection off the scan window 110.

Figure 7A:
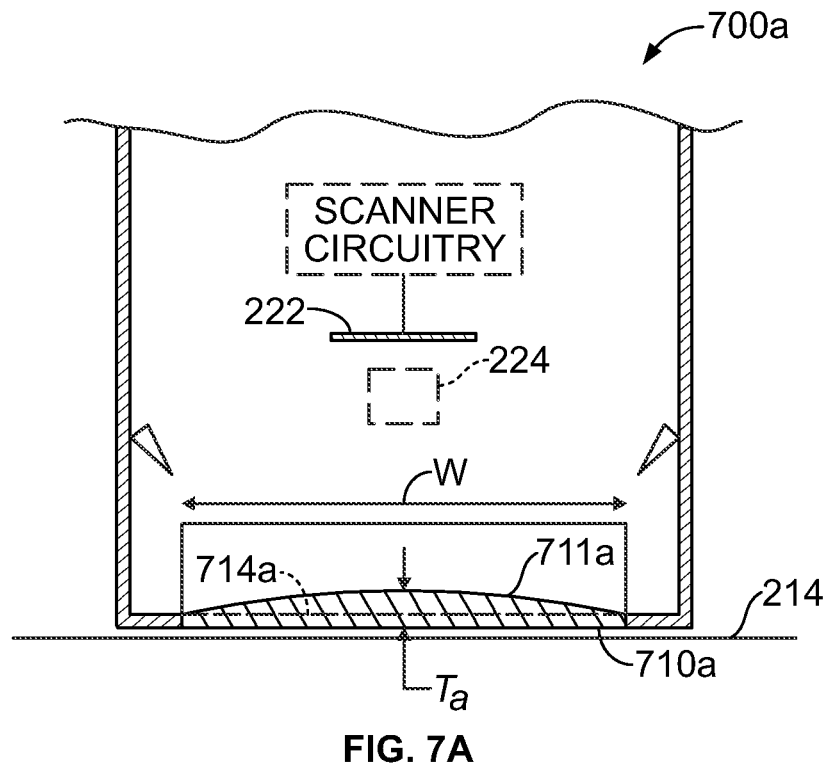
FIGS. 7A and 7B are cross-sectional top views of optical scanner configurations having scan windows with varying cross-sectional thicknesses.
Figure 7B:
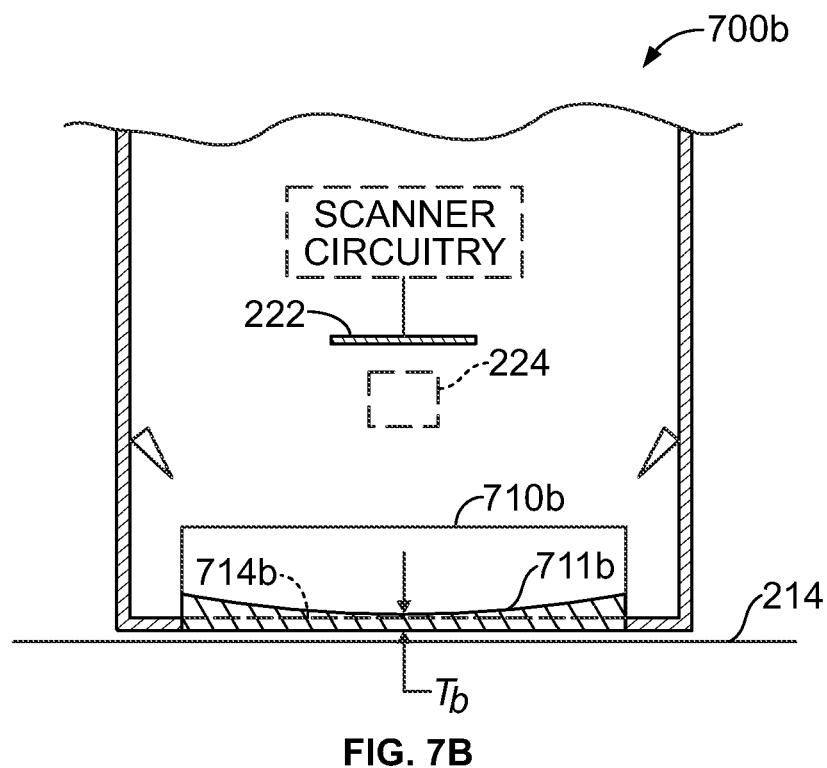

FIGS. 7A and 7B are cross-sectional top views of handheld optical scanners 700a and 700b, respectively. In one aspect of these embodiments, each of the scanners 700 includes a scan window 710 that is shaped in one more dimensions to produce desirable scan image characteristics. The scan window 710a of FIG. 7A, for example, has a convex inner surface 711a which results in a cross-sectional thickness Ta that increases toward a mid-portion of the scan window 710a and decreases toward the outer ends. This convex shape is illustrated by comparing the inner surface 711a to a constant thickness reference line 714a. Shaping the inner surface 711a as shown in FIG. 7A can have the effect of enlarging or magnifying the scanned image in the W direction, thereby reducing the field of view in this direction. Such magnification may be desirable, for example, to increase the level of detail available for character recognition.

In contrast to the scan window 710a, the scan window 710b of FIG. 7B has a concave inner surface 711b. As a result, the scan window 710b has a cross-sectional thickness Tb that decreases toward a mid-portion of the scan window and increases toward the outer ends. This concavity is illustrated by comparing the inner surface 711b to a constant thickness reference line 714b. Shaping the inner surface 711b in this manner can have the effect of reducing the size of the scan image in the W direction, thereby increasing the field of view in this direction. Increasing the field of view may be desirable, for example, to increase the amount of text imaged in a single pass of the scanner, or to reduce the depth or aperture of the optical system 224.

Figure 8A:
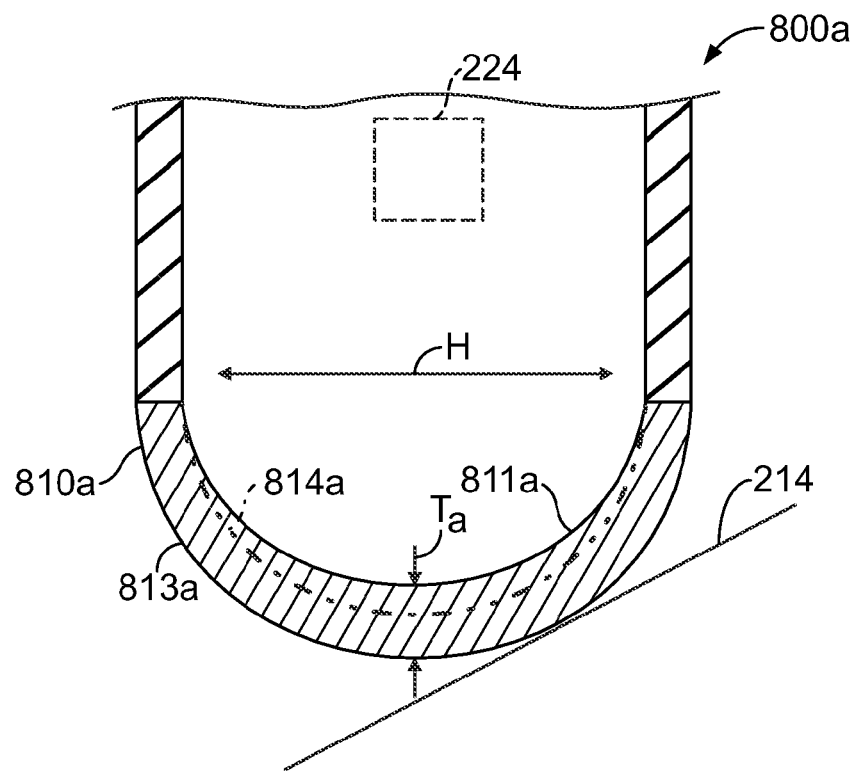
FIGS. 8A-8B are cross-sectional side views of optical scanner configurations having scan windows with varying cross-sectional thicknesses.
Figure 8B:
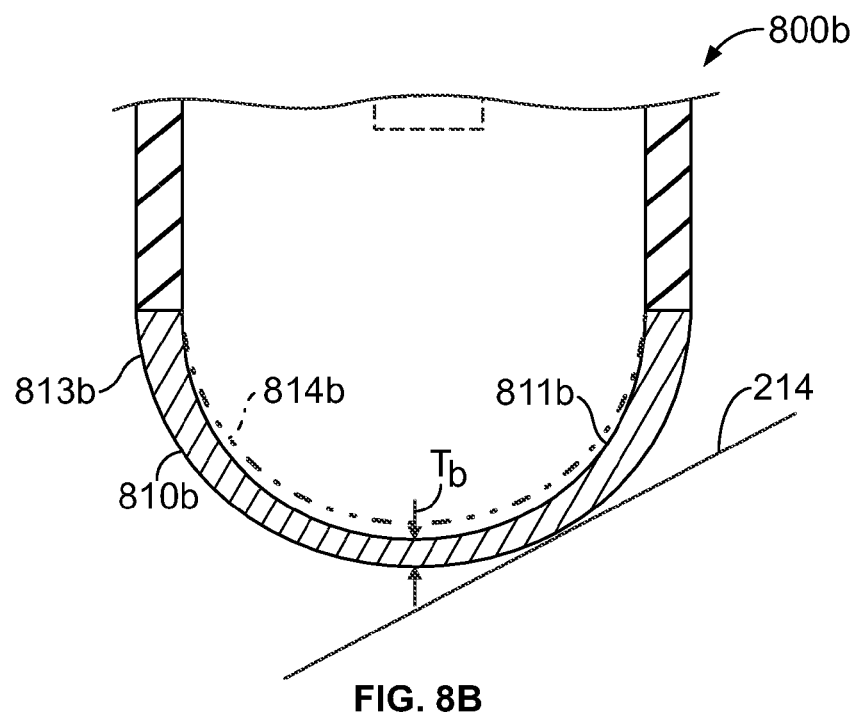

FIGS. 8A and 8B are cross-sectional side views of handheld optical scanners 800a and 800b, respectively, taken at a location indicated by line 8-8 in FIG. 1A. In FIGS. 8A and 8B, the scanners 800 are shown at an incline to the document 214 to illustrate one possible orientation during use. Use of the scanners 800, however, is not limited to this particular orientation. Indeed, the scanners 800 can be used in many other orientations including, for example, an orientation that is more perpendicular to the page 214.

As shown in FIG. 8A, the scanner 800a includes a scan window 810a having an inner surface 811a and an outer surface 813a. In this particular embodiment, the outer surface 813a is at least approximately cylindrical, and the inner surface 811a moves gradually inward and away from a constant-thickness reference line 814a toward a mid-portion of the scan window 810a. This shape results in a cross-sectional thickness Ta that increases toward the mid-portion of the scan window 810a. One effect of varying the scan window thickness as illustrated in FIG. 8A can be to magnify the scan image focused on the image sensor 222 (not shown in FIG. 8A) in a height direction H. Such magnification or enlargement may be desirable to improve character recognition and/or resolution parameters.

In one embodiment, the cross-section of the scan window 810a illustrated in FIG. 8A can be constant over the entire length of the scan window in the W direction (see FIG. 7A). In other embodiments, the cross-section of the scan window 810a can vary over its length in the W direction. For example, in one embodiment, the cross-section of the scan window 810a can vary over its length in the W direction in the manner illustrated by the scan window 710a of FIG. 7A.

In contrast to the scan window 810a of FIG. 8A, the scan window 810b of FIG. 8B has an inner surface 811b that moves outwardly and away from a constant-thickness reference line 814b toward a mid-portion of the scan window. This increases the concavity of the inner surface 811b relative to an outer surface 813b, and results in a cross-sectional thickness Tb that decreases toward the mid-portion of the scan window 810b. One effect of varying the cross-sectional thickness of the scan window 810b as shown in FIG. 8B can be to reduce the size of the scan image in the H direction. Such reduction may be advantageous if increasing the field of view in the H direction is desired.

In one embodiment, the scan window cross-section illustrated in FIG. 8B can remain constant over the entire length of the scan window and the W direction. In another embodiment, the cross-section of the scan window 810b can vary over its length in the manner illustrated by the scan window 710b of FIG. 7B.

Although various scan window shapes and surface contours have been discussed above with reference to FIGS. 7A-8B, other embodiments can include scan windows having other shapes and/or other surface contours. For example, other scan windows configured in accordance with the present disclosure can include combinations of the cross-sectional variations discussed above with reference to FIGS. 7A-8B. In yet other embodiments, the different thickness variations discussed above can be achieved by contouring the outer surface of the scan window, as opposed to the inner surface. In still further embodiments, the cross-sectional thickness of the scan window can be varied by contouring both the inner and outer surfaces to achieve favorable image magnification or reduction characteristics. Furthermore, the various scanner configurations disclosed herein are not limited to cylindrical, or generally cylindrical, scan windows, but instead can include other scan windows including, for example, flat windows, round windows, conical windows, parabolic windows, etc. Accordingly, those of ordinary skill in the art will appreciate that the various scanner features disclosed herein are not limited to use with the particular scan window configurations discussed above.

Figure 9:
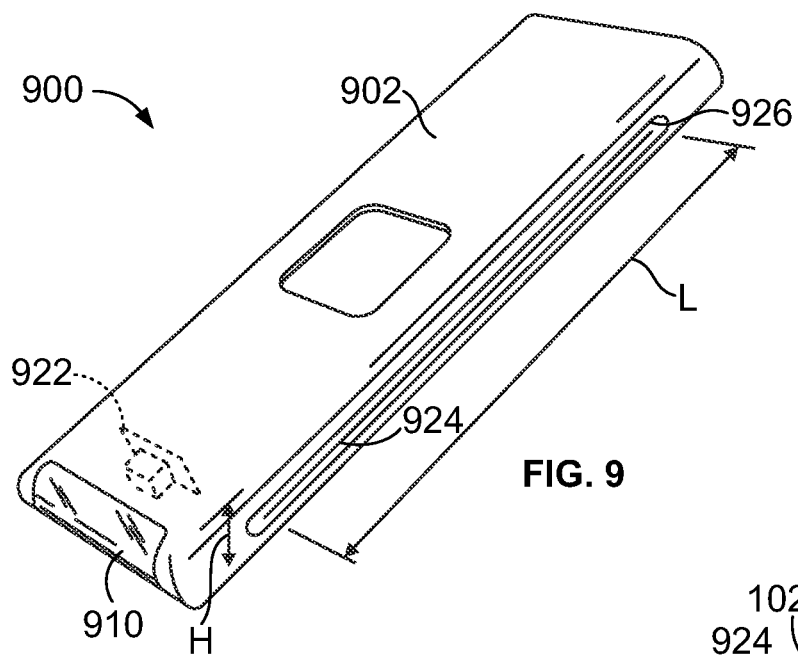
FIG. 9 is an isometric view of a hand-held optical scanner configuration having a first image sensor proximate a first facet and a second image sensor proximate a second facet.

FIG. 9 is an isometric view of a hand-held optical scanner 900. Many features of the scanner 900 can be at least generally similar in structure and function to corresponding features of the scanners described above with reference to FIGS. 1A-8B. For example, the scanner 900 includes a first image sensor 922 positioned toward one end of a body 902 that is at least generally similar in structure and function to the image sensor 222 described above with reference to FIG. 2. In this regard, the scanner 900 also includes a scan window 910 that is at least generally similar in structure and function to one or more of the scan windows 110, 710 or 810 described above.

In one aspect of this particular embodiment, however, the scanner 900 further includes a second image sensor 924 positioned toward one side of the body 902. The body 902 includes an aperture 926 through which the second image sensor 924 can scan images. In one embodiment, the aperture 926 can be covered by a transparent or translucent window or a lens. In another embodiment, the aperture 924 can remain open and the image sensor 924 can be inset slightly from the aperture. In still further embodiments, the second image sensor 924 can be positioned at least generally flush with the side surface of the body 902 so that the second image sensor 924 is in contact (or near contact) with the surface of the document or other object it is scanning.

In one embodiment, the first image sensor 922 can be a two-dimensional (2D) image sensor for scanning text or other images in the manner described above with reference to FIGS. 1A-1D, and the second image sensor 924 can be a one-dimensional (1D) image sensor having a length L for scanning or copying broader portions of text or other images in a relatively fast manner. As used herein, the term 1D image sensor is used to refer to an image sensor having a generally linear array of sensing elements (e.g., pixels), although it will be understood by those of skill in the art that such a sensor will likely include a plurality of sensing elements (e.g., two or three rows of sensing elements) in the height direction H.

Figure 10:
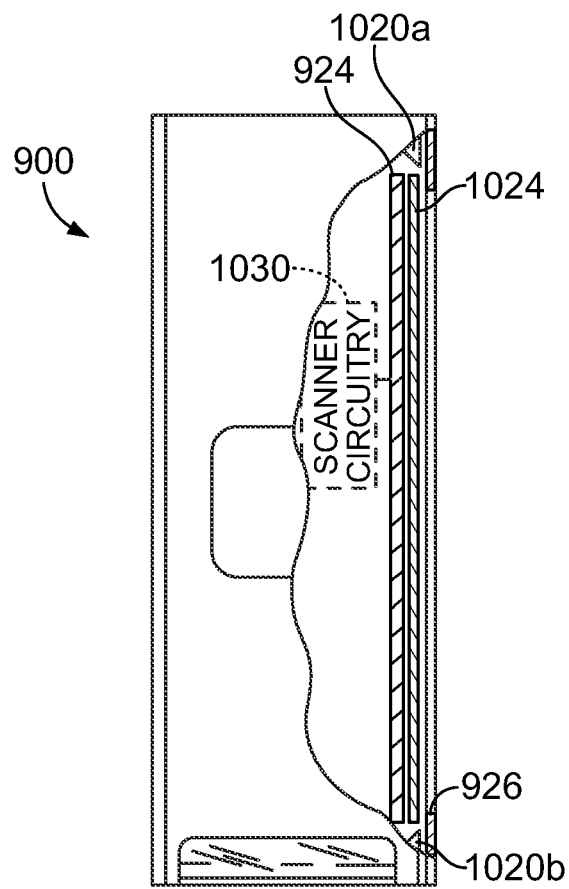
FIG. 10 is a partially cut-away, cross-sectional top view taken through a side portion of the optical scanner of FIG. 9, illustrating various features associated with the second image sensor.

FIG. 10 is a partially cut away, cross-sectional top view of the hand-held optical scanner 900 of FIG. 9. In this embodiment, the second image sensor 924 is inset slightly from the body aperture 926. In addition, an optical system 1024 comprising one or more of lenses can be positioned in front of the second image sensor 924 to focus the scanned image on the sensor. In other embodiments, a contact image sensor (CIS) may be used to focus the image of the illuminated scan region onto the surface of the image sensor 924. Although not shown in detail in FIG. 10, the scanner 900 can include an arrangement of one or more light sources 1020 to illuminate the scan region. Like the scanner 100 described above with reference to FIG. 2, the second image sensor 924 is operably connected to suitable scanner circuitry 1030 for processing the data signals from the image sensor 924 before transmission to the scanner CPU (not shown).

Although the second image sensor 924 is offset from the aperture 926 in the embodiment of FIG. 10, as discussed above with reference to FIG. 9, in other embodiments, the second image sensor 924 can be positioned closer to the aperture 926 so that it is in contact, or near-contact, with the surface of the document or other object being scanned.

The second image sensor 924 can be used to capture relatively large areas of text, images, or other markings in a single scanner pass. For example, this sensor can be employed when the user desires to scan a particular paragraph or larger section of text and identify the corresponding document (or version of the document) and/or the particular page. In contrast, the user may elect to use the first image sensor 922 when the user wishes to capture all or a portion of a particular sentence or other relatively small marking.

Figure 11A:
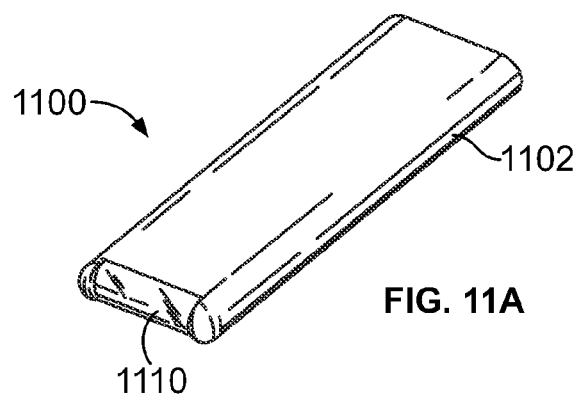
FIGS. 11A-11C are isometric, end, and cross-sectional side views, respectively, of another configuration of a hand-held optical scanner.
Figure 11B:
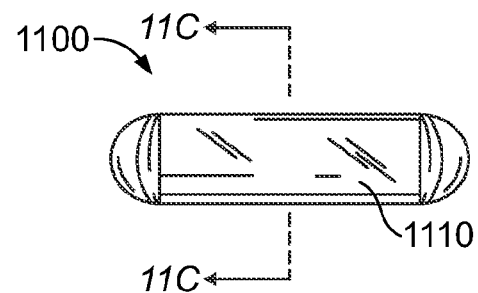
Figure 11C:
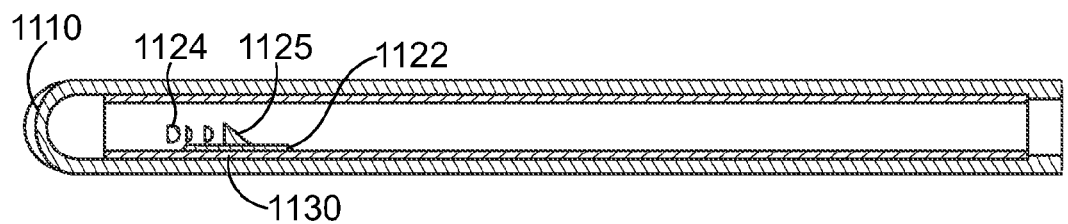

FIGS. 11A-11C are isometric, end, and cross-sectional side views, respectively, of a hand-held optical scanner 1100. Referring first to FIG. 11A, the scanner 1100 includes a scan window 1110 positioned toward an end portion of a body 1102. Many features of the scanner 1100 can be at least generally similar in structure and function to corresponding features of the various hand-held optical scanners described above with reference to FIGS. 1A-10.

FIG. 11C is a cross-sectional side view taken substantially along line C-C in FIG. 11B. In the illustrated configuration, the scan window 1110 can include a curved lens (e.g., a curved clear lens) that is inset slightly from the end of the scanner body 1102. In other configurations, however, the scan window can include other suitably transparent or translucent materials in other positions relative to the scanner body 1102. In one aspect of this particular configuration, the scanner 1100 includes a light turning or folding element 1125 (e.g., a light folding prism) which directs the image light from an optical system 1124 onto an image sensor 1122. The optical system 1124 can include an array of one or more lenses to suitably focus the image light onto the light folding element 1125. In another aspect of this configuration, the image sensor 1122 is oriented at an angle (e.g., a right angle or at least approximately 90 degrees) relative to the image light. The image sensor 1122 can be operatively connected to image circuitry 1130 for amplification, A/D conversion, and/or other processing of the signals from the image sensor 1122. In this regard, the scanner circuitry 1130 can include a printed circuit board assembly and/or other electrical/processing systems.

Figure 12:
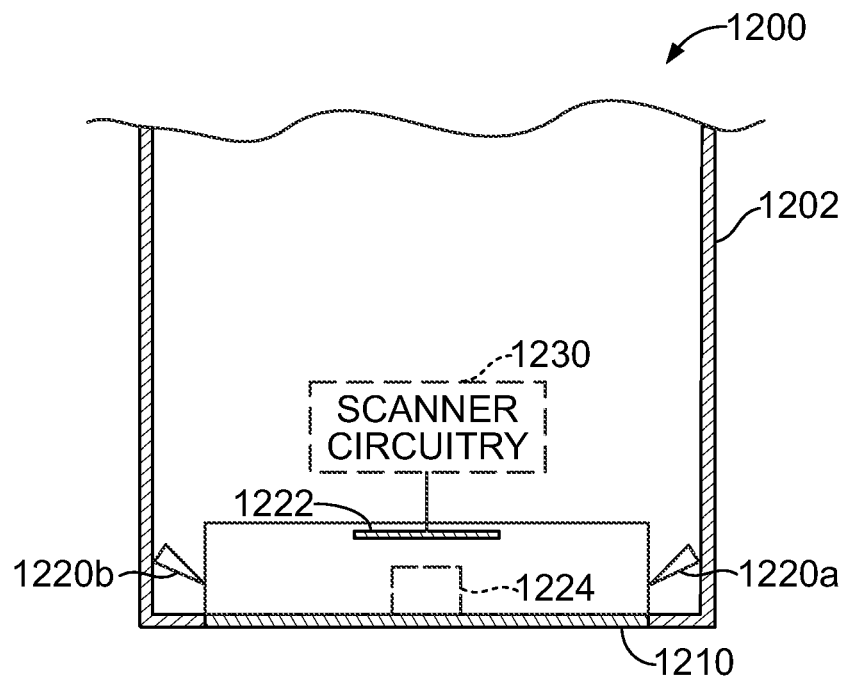
FIG. 12 is a cross-sectional top view of a portion of an optical scanner having a scan window and other features arranged in another configuration.

FIG. 12 is a cross-sectional top view of a scanner 1200 which is at least generally similar in structure and function to the scanner 200 described above with reference to FIG. 2. For example, the scanner 1200 includes a transparent or translucent scan window 1210 positioned toward one end of a scanner body 1202. A plurality of light sources 1220 (identified individually as a first light source 1220a and a second light source 1220b) illuminate a region in front of the scan window 1210 during operation of the scanner 1200. An optical system 1224 (shown schematically) directs image light from the illuminated scan region to an image sensor 1222. The scan window 1210, the optical system 1224, the image sensor 1222 and associated scanner circuitry 1230 can be at least generally similar in structure and function to corresponding features of the scanner 200 described above.

The scanner configuration illustrated in FIG. 12 differs from that shown in FIG. 2 in that there is little or no space between the optical system 1224 and the scan window 1210. For example, in one configuration, the optical system 1224 can contact, or be in near contact with, the scan window 1210 as illustrated in FIG. 12. In this configuration, the optical system 1224 (or image sensor 1222) can be positioned from about 0.0 inch to about 0.1 inch away from the inner surface of the scan window 1210. In another configuration, the optical system 1224 (and/or image sensor 1222) can be positioned from about 0.0 inch to about 0.25 inch away from the inner surface of the scan window 1210. In other configurations, the optical system 1224 (and/or the image sensor 1222 and associated scanner circuitry 1230) can be inset from the scan window 1210, but not as far inset as the optical system 224 illustrated in FIG. 2.

When the optical system 1224 and the image sensor 1222 move closer to the scan window 1210 as shown in FIG. 12, the light sources 1220 can be suitably located in various positions to provide ample illumination of the scan region. For example, in one configuration the light sources 1220 can be positioned relatively close the scan window 1220 as illustrated in FIG. 12. In other configurations, the light sources 1210 (or a single light source 1220) can be positioned in more inboard, or in more remote, locations than illustrated in FIG. 12.

FIGS. 13A and 13B are schematic diagrams of successive scan images of a letter "B" captured by the image sensor 222 as the associated scanner (not shown) moves across a document (also not shown) in direction F. In this example, the cross-hatched regions 1302a and 1302b represent portions of the scan image that are obscured or otherwise adversely affected by glare from specular reflection. In the position of FIG. 13A, the scanner circuitry records a first portion 1 and a second portion 2 of the first scan image. Shortly thereafter, the scanner moves to the position of FIG. 13B and the scanner circuitry records a third portion 3 and a fourth portion 4 of the second scan image. As will be noted, the recorded portions of the scan images omit the regions 1302 which are adversely affected by specular reflection. Once the scanner circuitry has recorded the scan image portions 1-4 in the foregoing manner, the portions can be assembled or "stitched" together to form a complete and unobscured scanned image of the letter "B," as described in more detail below with reference to FIG. 14.

FIG. 14 is a schematic diagram of a composite image that the scanner circuitry has assembled from the scan image portions 1-4 discussed above. The first portion 1 and the second portion 2 of the image shown in FIG. 14 were recorded from the scan image of FIG. 13A. The third portion 3 and the fourth portion 4 of the image shown in FIG. 14 were recorded from the scan image of FIG. 13B. The foregoing process illustrates one method for recording a complete scan image using portions of captured images that may include regions obscured from glare.

Figure 15:
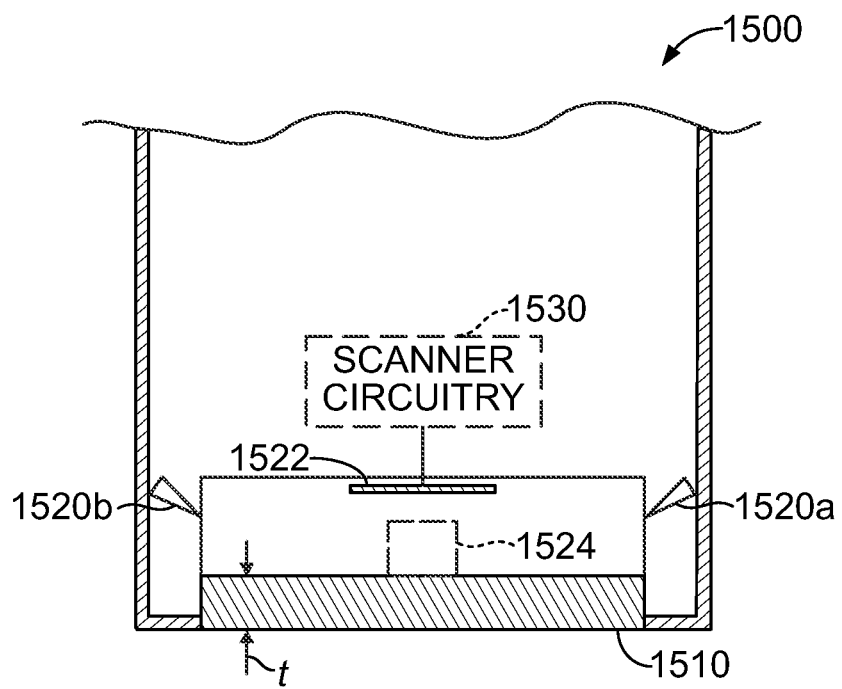
FIG. 15 is a cross-sectional top view of a portion of an optical scanner having a scan window and other features arranged in yet another configuration.

FIG. 15 is a cross-sectional top view of a scanner 1500 which is at least generally similar in structure and function to the scanner 200 described above with reference to FIG. 2. In this regard, the scanner 1500 includes a plurality of light sources 1520 (identified individually as a first light source 1520a and a second light source 1520b) which illuminate a region in front of a transparent or translucent scan window 1510 during operation of the scanner 1500. An optical system 1524 (shown schematically) directs image light from the illuminated scan region to an image sensor 1522.

In the illustrated configuration, the scan window 1510 has a thickness t which is relatively thick. For example, the thickness t can range from about 0.10 inch to about 1.5 inch. In another configuration, the thickness t can range from about 0.25 inch to about 1.25 inch; or from about 0.5 inch to about 1.0 inch. In a further configuration, the thickness t can range from about 0.75 inch to about 1.0 inch. In other configurations, the scan window 1510 can have other thicknesses depending on various factors such as optical quality, manufacturability, etc. In one aspect of this configuration, there is little or no space between the optical system 1524 and the inner surface of the scan window 1510. For example, in one configuration, the optical system 1524 can contact, or be in near contact with, the scan window 1510 as illustrated in FIG. 15.

From the foregoing, it will be appreciated that various embodiments of hand-held optical scanners and related features have been described herein for purposes of illustration, but that various modifications may be made without deviating from the spirit and scope of the present disclosure. Accordingly, the invention is not limited, except as by the appended claims.

We claim:

1. A hand-held optical scanner, comprising:
    a scan window;
    a first light source and a second light source that are positioned within the hand-held optical scanner, wherein the first light source and the second light source emit light for passing through the scan window to illuminate an adjacent scan region;
    a controller operatively connected to the first light source and the second light source, wherein the controller is configured to cause the first light source and the second light source to cycle on and off in sequence such that no more than one of the first light source and the second light source is on at any time;
    an image sensor that captures light that passes from the adjacent scan region into the hand-held optical scanner through the scan window and provides an electrical signal based on the captured light; and
    scanner circuitry that is operatively connected to the image sensor, wherein the scanner circuitry is configured to selectively record a first portion of light captured by a first region of the image sensor when the first light source is on and the second light source is off and record a second portion of light captured by a second region of the image sensor when the second light source is on and the first light source is off.

2. The hand-held optical scanner of claim 1, further comprising:
    a light shield that is configured to block at least a portion of the emitted light from reaching the scan window.

3. The hand-held optical scanner of claim 1 wherein the first light source and the second light source each include a diffuse light source.

4. The hand-held optical scanner of claim 1, further comprising:

a first light polarizing filter through which at least a portion of the emitted light passes; and a second light polarizing filter through which at least a portion of the emitted light that is reflecting off the scan window passes, the first and second polarizing filters being rotationally aligned in a way that produces a cross-polarization effect.

5. The hand-held optical scanner of claim 1 wherein the scan window has an inner surface spaced apart from an outer surface to define a cross-sectional thickness of the scan window, and wherein the cross-sectional thickness of the scan window varies in a first direction.

6. The hand-held optical scanner of claim 1 wherein the scan window has an inner surface spaced apart from an outer surface to define a cross-sectional thickness of the scan window, and wherein the cross-sectional thickness of the scan window varies in a first direction and a second direction.

7. The hand-held optical scanner of claim 1 wherein the scan window is configured to magnify at least a portion of a scan image that is focused on the image sensor.

8. The hand-held optical scanner of claim 1 wherein the scan window is configured to reduce the size of at least a portion of a scan image that is focused on the image sensor.

9. The hand-held optical scanner of claim 1 wherein the scan window has a thickness of from about 0.50 inch to about 1.0 inch.

10. The hand-held optical scanner of claim 1, further comprising a single light polarizing filter through which at least a portion of the emitted light that is reflecting off the scan window passes.

11. The hand-held optical scanner of claim 1 wherein the scanner circuitry is further configured to combine the first portion of light and the second portion of light to form an image.

12. The hand-held optical scanner of claim 1 wherein the scanning window comprises a translucent material.

13. The hand-held optical scanner of claim 1 wherein the scanning window comprises a transparent material.

14. A hand-held optical scanner having a roughly rectangular body, the hand-held optical scanner comprising:
    a scan window in a first side of the body, the scan window occupying at least 75% of the larger of a first dimension and a second dimension of the first side of the body;
    an aperture in a second side of the body, the aperture occupying at least 75% of the larger of a first dimension and a second dimension of the second side of the body;
    one or more light sources that are positioned within the hand-held optical scanner, wherein the one or more light sources emit light to illuminate an adjacent scan region;
    a first image sensor configured to receive light that passes from the adjacent scan region into the hand-held optical scanner through the scan window;
    a second image sensor configured to receive light that passes from the adjacent scan region into the hand-held optical scanner through the aperture; and
    a reflection-reducing component that reduces an amount of the emitted light that reflects off of the scan window so that the first image sensor receives less of the emitted light that reflects off of the scan window;
    wherein the second side of the body is approximately perpendicular to the first side of the body and the larger of the first and second dimensions of the second side of the body is at least twice as large as the larger of the first and second dimensions of the first side of the body.

15. A hand-held optical scanner, comprising:
    a first scan window in a first side of the hand-held optical scanner;
    a second scan window in a second side of the hand-held optical scanner;
    one or more light sources that are positioned within the hand-held optical scanner, wherein the one or more light sources emit light to illuminate an adjacent scan region;
    a first image sensor configured to receive light that passes from the adjacent scan region into the hand-held optical scanner through the first scan window; and
    a second image sensor configured to receive light that passes from the adjacent scan region into the hand-held optical scanner through the second scan window,
    wherein each of the first side and the second side have a first dimension and a second dimension, and the larger of the first and second dimensions of the second side is at least twice as large as the larger of the first and second dimensions of the first side.

16. The hand-held optical scanner of claim 15, further comprising a reflection-reducing component configured to reduce an amount of the emitted light that reflects off of the first scan window so that the first image sensor receives less of the emitted light that reflects off of the first scan window.

17. The hand-held optical scanner of claim 16, further comprising a second reflection-reducing component configured to reduce an amount of the emitted light that reflects off of the second scan window so that the second image sensor receives less of the emitted light that reflects off of the second scan window.

18. The hand-held optical scanner of claim 15,
    wherein the first image sensor comprises a two-dimensional image sensor having a two-dimensional array of sensing elements, and
    wherein the second image sensor comprises a one-dimensional image sensor having a linear array of sensing elements.

* * * * *